(12) United States Patent
Cylvick

(10) Patent No.: US 11,844,996 B2
(45) Date of Patent: Dec. 19, 2023

(54) LIFT, DROP, SWING, AND ATTENUATION APPARATUS AND METHOD

(71) Applicant: ZIPHOLDINGS, LLC, Coalville, UT (US)

(72) Inventor: Eric Cylvick, Coalville, UT (US)

(73) Assignee: ZIPHOLDINGS, LLC, Coalville, UT (US)

( * ) Notice: Subject to any disclaimer, the term of this patent is extended or adjusted under 35 U.S.C. 154(b) by 36 days.

(21) Appl. No.: 17/462,910

(22) Filed: Aug. 31, 2021

(65) Prior Publication Data

US 2022/0054877 A1    Feb. 24, 2022

Related U.S. Application Data

(60) Continuation-in-part of application No. 17/217,660, filed on Mar. 30, 2021, now abandoned, which is a
(Continued)

(51) Int. Cl.
*A63B 9/00* (2006.01)
*A63B 21/00* (2006.01)
*A63B 69/00* (2006.01)

(52) U.S. Cl.
CPC ............ *A63B 9/00* (2013.01); *A63B 21/4007* (2015.10); *A63B 69/0048* (2013.01)

(58) Field of Classification Search
CPC ... A63B 9/00; A63B 69/0048; A63B 21/4007; A63B 2220/20; A63B 71/022; A63B 2225/20; A63B 2220/51; A63B 71/023; A63B 2225/093; A63B 71/0054; A63B 2210/50; A63B 2220/80; A63B 2209/02; A63B 2225/50; A63B 2220/10; A63B 71/02; A63B 1/00; A63B 21/4009;
(Continued)

(56) References Cited

U.S. PATENT DOCUMENTS 4,449,716 A * 5/1984 Goldy ................ A63B 69/0064
                                                          254/398
4,458,781 A * 7/1984 Ellis ........................ A62B 1/10
                                                          182/8
(Continued)

FOREIGN PATENT DOCUMENTS

CA          2181352        7/1995
WO        WO9519827        7/1995

*Primary Examiner* — Garrett K Atkinson
(74) *Attorney, Agent, or Firm* — Pate Nelson & Hill, PLLC

(57) ABSTRACT

A tower may support a horizontal track and a vertical climbing wall therebelow. A trolley, movable along the track, may be selectively driven toward and away from the tower by belay lines, line and capstan, positive drive, or some combination. Belay lines reeved over pulleys on the trolley may be taken up and paid out independently from the trolley, while fixed or moving. A rider may climb, be lifted, or both to near the intersection of the tower and track, from there to fall or jump into a controllable trajectory such as swinging or simulating a parachute landing. Swinging may be rapidly attenuated almost entirely by "bumps," lifting a rider to remove momentum and kinetic energy as a rider moves toward a pivot point overhead. Control may be simplified based on sensing and using timing past bottom dead center (BDC).

7 Claims, 17 Drawing Sheets

US 11,844,996 B2
Page 2

Related U.S. Application Data division of application No. 16/431,524, filed on Jun. 4, 2019, now Pat. No. 10,960,252.

(60) Provisional application No. 63/089,657, filed on Oct. 9, 2020, provisional application No. 63/073,288, filed on Sep. 1, 2020, provisional application No. 62/839,665, filed on Apr. 27, 2019, provisional application No. 62/757,577, filed on Nov. 8, 2018, provisional application No. 62/680,909, filed on Jun. 5, 2018.

(58) Field of Classification Search
CPC ... A63B 21/4011; A63B 69/0064; A63B 7/04; A63B 21/4045; A63B 24/0087; A63B 2009/006; A63B 2220/50; A63B 2005/163; A63B 2220/52; A63B 2225/09; A63B 24/0003; A63B 24/0021; A63B 2071/0063; A63B 2071/0072; A63B 2071/0081; A63B 2220/13; A63B 2220/16; A63B 2220/56; A63B 2220/62; A63B 2220/801; A63B 2244/08; A63B 2244/081; A63G 31/00; A63G 9/00; A63G 2031/002; A63G 9/12; A63G 9/14; B64D 23/00; A62B 1/06

See application file for complete search history.

(56) References Cited

U.S. PATENT DOCUMENTS

| | | | | |
|---|---|---|---|---|
| 4,997,064 A * | | 3/1991 | Motte | A62B 35/0093 182/71 |
| 5,267,906 A * | | 12/1993 | Kitchen | A63G 31/00 472/133 |
| 5,527,223 A * | | 6/1996 | Kitchen | A63G 9/00 472/133 |
| 5,931,740 A * | | 8/1999 | Kitchen | A63G 9/00 472/133 |
| 6,083,142 A * | | 7/2000 | Wilson | A63B 69/0048 482/37 |
| 6,227,121 B1 * | | 5/2001 | Mares | A63G 1/00 104/53 |
| 6,322,483 B1 * | | 11/2001 | Rotella | A63B 21/1654 482/121 |
| 6,440,002 B1 * | | 8/2002 | Jackson | A63G 9/00 472/125 |
| 6,699,135 B2 * | | 3/2004 | Cochron | A63G 9/00 472/49 |
| 6,908,418 B2 * | | 6/2005 | Saure | A63B 21/0552 482/904 |
| 7,381,137 B2 * | | 6/2008 | Steele | B61B 12/06 472/45 |
| 7,600,610 B2 * | | 10/2009 | Deuer | F03D 80/50 182/8 |
| 7,976,445 B2 * | | 7/2011 | Lalaoua | A63B 21/4005 482/904 |
| D654,124 S * | | 2/2012 | Davis | D21/662 |
| 8,141,681 B2 * | | 3/2012 | Brickell | A62B 1/10 182/8 |
| 8,205,718 B2 * | | 6/2012 | Taylor | A63B 69/0064 182/19 |
| 8,821,359 B1 * | | 9/2014 | Kassel | A63B 21/0557 482/904 |
| 8,986,178 B2 * | | 3/2015 | Klopman | A63B 7/085 482/142 |
| 9,220,966 B2 * | | 12/2015 | Garner | A63B 69/187 |
| 9,339,682 B2 * | | 5/2016 | Braier | A63B 21/1618 |
| 9,427,622 B2 * | | 8/2016 | Thrasher-Rudd | A63B 23/1209 |
| 9,480,865 B2 * | | 11/2016 | Naylor | E04G 21/3295 |
| 9,545,533 B2 * | | 1/2017 | Boyer | A63B 22/16 |
| 9,630,043 B2 * | | 4/2017 | Foster | A63B 21/4021 |
| 9,636,535 B2 * | | 5/2017 | Schleiden, II | A63B 21/0552 |
| 9,732,956 B2 * | | 8/2017 | Benedict | F21V 33/008 |
| 9,764,175 B2 * | | 9/2017 | Klopman | A63B 7/085 |
| 9,867,452 B1 * | | 1/2018 | Martinez | A47C 1/146 |
| 9,962,588 B2 * | | 5/2018 | Allington | A62B 1/08 |
| 10,376,798 B2 * | | 8/2019 | Hreniuk-Mitchel | A63B 69/0048 |
| 10,780,360 B2 * | | 9/2020 | Hreniuk-Mitchell | A63G 21/22 |
| 2002/0046903 A1 * | | 4/2002 | Strickler | A63B 69/0048 182/36 |
| 2004/0087420 A1 * | | 5/2004 | Montesquieux | A63B 21/1636 482/121 |
| 2004/0215114 A1 * | | 10/2004 | Cruz | A61H 11/00 601/129 |
| 2004/0238277 A1 * | | 12/2004 | Kruse | A63B 29/02 182/36 |
| 2006/0027134 A1 * | | 2/2006 | Steele | B61B 12/06 104/113 |
| 2007/0175698 A1 * | | 8/2007 | Ketring | A62B 1/14 182/8 |
| 2008/0185221 A1 * | | 8/2008 | Postma | A63B 69/0048 700/80 |
| 2009/0075788 A1 * | | 3/2009 | Hetrick | A63B 21/4043 482/91 |
| 2009/0211846 A1 * | | 8/2009 | Taylor | A63B 69/0064 182/231 |
| 2012/0238421 A1 * | | 9/2012 | Klopman | A63B 7/085 482/142 |
| 2013/0165301 A1 * | | 6/2013 | Thrasher-Rudd | A63B 7/00 482/129 |
| 2013/0240298 A1 * | | 9/2013 | Naylor | E04G 21/3295 182/231 |
| 2015/0051006 A1 * | | 2/2015 | Checketts | A63G 9/04 472/118 |
| 2016/0089577 A1 * | | 3/2016 | Boyer | A63B 22/18 472/135 |
| 2016/0245503 A1 * | | 8/2016 | Benedict | F21V 33/008 |
| 2016/0325130 A1 * | | 11/2016 | Grund | A63B 7/085 |
| 2016/0361660 A1 * | | 12/2016 | Hreniuk-Mitchell | A63B 69/0048 |
| 2018/0035792 A1 * | | 2/2018 | Martinez | A45F 3/26 |
| 2018/0185690 A1 * | | 7/2018 | Coulter | A63B 71/03 |
| 2019/0358551 A1 * | | 11/2019 | Hreniuk-Mitchell | A63G 21/16 |
| 2020/0144824 A1 * | | 5/2020 | Campus | G05B 19/042 |

* cited by examiner

LIFT, DROP, SWING, AND ATTENUATION APPARATUS AND METHOD

RELATED APPLICATIONS

This application claims the benefit of U.S. provisional Patent Application Ser. No. 63/089,657, filed Oct. 9, 2020 and U.S. provisional Patent Application Ser. No. 63/073,288, filed Sep. 1, 2020. This application is a continuation in part of U.S. patent application Ser. No. 17/217,660, filed Mar. 30, 2021, which is a continuation (divisional) application of U.S. patent application Ser. No. 16/431,524, filed Jun. 4, 2019, now issued as U.S. Pat. No. 10,960,252 on Mar. 30, 2021; which claims the benefit of U.S. provisional Patent Application Ser. No. 62/680,909, filed Jun. 5, 2018, U.S. Provisional Patent Application Ser. No. 62/757,577, filed Nov. 8, 2018, and U.S. Provisional Patent Application Ser. No. 62/839,665, filed Apr. 27, 2019. All of the foregoing are hereby incorporated herein by reference in their entireties.

This patent application hereby incorporates herein by reference the following patents: U.S. Pat. No. 10,053,115, issued Aug. 21, 2018, U.S. Pat. No. 10,010,798, issued Jul. 3, 2018, U.S. Pat. No. 9,669,319, issued Jun. 6, 2017, U.S. Pat. No. 10,053,115 issued Aug. 21, 2018, and U.S. Pat. No. 10,010,798, issued Jul. 3, 2018.

BACKGROUND

Field of the Invention

This invention relates to amusement rides and, more particularly, to novel systems and methods for climbing walls, pendulum falls, swing mechanisms, and jump towers.

BACKGROUND ART

Rock climbing is a popular sport that has become more universal as people have become aware of its possibilities. The increase in artificial climbing walls and indoor climbing gyms containing such walls has led to increased training and recreational climbing on artificial climbing walls. Notably, climbing walls often rely on a "top rope" anchored above, wherein a "belayer" takes up slack in a rope as a climber secured to the other end ascends.

Meanwhile, thrill rides have been a staple of circuses, carnivals, and theme parks almost since their inception. At these venues, several requirements, including safety and skill, tend to increase the need for trained staff, trained users, and safety mechanisms for the devices. In climbing this need is met with top roping and the belayer, a second person. In thrill rides, this need is met by guides, attendants, operators, locks, cages, safety bars, and the like that fix persons in a cart closely controlled on arms, rails, cables, decks, or some other form of support system.

BRIEF SUMMARY OF THE INVENTION

What is lacking is throughput at a safe condition with minimal labor cost and training. Also lacking is the fun of rock climbing, combined with a swing for a safe pendulum fall, rapid attenuation for throughput, and an option for additional drops before termination. It would be an advance in the art to provide a system that combines a climbing wall, engineered to this specific purpose, with a support system for a swing acting as a belay system. It would also be an advance to have a swing that loads faster, provides more variations of "trajectory," and can be stilled more quickly to shorten the "decay time" or "runout time."

In view of the foregoing, in accordance with the invention as embodied and broadly described herein, a method and apparatus are disclosed in one embodiment of the present invention as including a swing as a belay system for wall extending upward, in front of a climber, and typically extending laterally to the right or the left in front of the climber. In certain embodiments, the swing system may operate without a wall, or operate to lift and swing riders who cannot or do not otherwise climb the wall.

A climber falling, missing a hold, finishing a route, or timing out may result in the belay system lifting the climber to the top. A trolley may operate to control a swing providing additional enjoyment, as well as a termination and ready completion of a "ride" or "cycle" on such a system. Thus, the fun is doubled, safety maintained and increased, level of skill reduced, all while permitting persons of lower or higher levels of skill to still enjoy the thrill of the ascent and of the pendulum fall. Meanwhile, the number of attendants required for operating a ride is minimized, while throughput is controlled and increased.

Swinging may initiate by a "fall" from the wall or lifting to a location nearby. Swinging may be induced by "pumping," changing the relative positions of a suspension center of pivot and the center of gravity of the load (riders). Damping by neutralizing momentum provides a conclusion of the ride after an initial maximum swing (or more) by moving the center of rotation of the swing in the same direction as the rider after the rider passes bottom dead center. Meanwhile, in doing so by moving the trolley, the line is also taken up, raising the rider thus removing potential energy of the line pulling back and the ability to descend, the oscillation can be rapidly attempted by 90% in a simple stroke of the trolley.

An overhead beam may extend back, to a location above and behind the climber, from the main frame to suspend a belay line. In other embodiments, the overhead center of suspension of a climber may be positioned on some other independent structure, such as a beam or the like some distance away from the climbing wall.

A system combining a climbing wall with a swing may be characterized as a climbing wall that will terminate in a pendulum fall. The pendulum fall results in a swinging motion of a harnessed user, or a vehicle of multiple riders, away from the climbing wall and out into space away from the wall. A user continues to swing, until the swinging has decayed, after which the system descends the user to the original launch area from which the climb was begun, to be unclipped from the belay line, and released from the climbing area.

One embodiment of a system may operate as both a climbing wall and a swing. Typically, a climber will enter a preparation area and harness up with a full body harness. The climber may then proceed at an appropriate time with certain permissions and safety precautions in place, to a launch area. A computer may be used to control tension in a connecting line, rope, cable, or the like. Also, a computer may be used to control lengths of line extended, detect position (of the line, the trolley, or both), read any parameter sensor present to monitor each and any device, and track overall safety conditions as well as timing and performance of climbers, riders, or both.

Eventually, in a launch area, riders load into a "gondola," a cart or vehicle, and locking, or a line is connected to a harness on a user. Upon a proper safety check and weighing of the individual rider, the user may then proceed to climb the wall, whose holds may be out of reach until the belay lifts the rider. Climbing is done by using hand holds, foot holds, and a textured surface of the wall. The wall is maintained in its place by a suitably strong and stiff framing system.

A positioner may include, or be implemented in, a trolley with wheels operating along a rail (track) mounted to or part of a horizontal beam in order to support a hanger with connections to the line. In various embodiments, a ball screw, hydraulic take-up, capstan, or other drive system may move a trolley. A wire rope, high-strength synthetic rope, or other cable system may do so. A trolley mover may cause a locked off belay line to pay out or take up due to trolley motion. A hoist may operate directly on the belay line, with or without moving a center of pivot of that line. Multiple lines may be arranged to resist rotation or twisting.

Typically, sensors may detect position, proximity loading (such as tension, force, pressure, stress, etc.), or other parameters in order to detect the condition of the line and of the user. Falling from the wall or being drawn from it is an eventuality expected, and may be possible in virtually any case. It forms a part of the operation of the system that provides safety, reliability and part of the thrill of the climb, setting a starting point, and initiating falling in a pendulum fall therefrom.

Clipping in a harness of a user to a belay line may be followed by taking up any slack. Sensors may sense tension, position, weight, or other loading or motion parameters in order to determine when to open interlocks and permit the climber to climb. Monitoring the various sensors may determine whether a climber has timed out beyond a permitted time on the wall, or topped out at the maximum physical extent of the wall, or has fallen from the wall. The swinging may be monitored simply by a timer and a proximity sensor detecting passing of lines past bottom dead center (BDC).

Accordingly, a retractor or positioner may take up line or change position of the trolley defining a center of pivot to swing the climber away from the wall, to eventually oscillate back and forth until motion is attenuated. Attenuation may be affirmatively effected by movement of the trolley to dissipate, or absorb and hold, kinetic energy into potential energy. Then the belay may descend the rider safely to the floor or supporting surface to be released (unclipped, exited, and unharnessed) and to leave the active area.

Various safety checks may be provided such as stop lights, actuation of a retractor or positioner (e.g., trolley) to remove the ability of a climber to move toward the wall, or the like. Typically, inspection, safety testing, weighing, evaluating, and the like will make a user safe in order to continue advancing to climbing a wall. Other safety mechanisms and sensors are also provided.

One method of belay does not permit descent by a user during the climb. It may simulate both rock climbing and a super-sized swing along an arc about a center of pivot. One may provide a wall simulating a rock formation extending above a supporting surface, such as the ground, a floor, a concrete pad, a deck on a trailer or the like. A belay anchor may be provided that can move from near the wall to a position far away (approaching the height or some fraction thereof) from the wall, supported by one of several mechanisms.

Upon harnessing a climber into a harness and securing (e.g., clipping a carabiner from) the harness to the belay anchor by a line extending therebetween, a climber may be protected (belayed) against falling. A climber may fall at the end of a climb, by design, but the line assures that the climber will not fall down, nor uncontrolled.

A retractor system may minimize a length of the line between the belay anchor and the harness during an ascent of the climber along the climbing wall some distance. Rather than immediately descending if a climber "falls," stalls, or otherwise ceases to progress, line tension may remain. Upon detection of any such suitable event (including timing out, signaling a finish, detecting a fall, etc.) the rider (e.g., climber) is eventually lifted up and away from contact with the wall.

Thereafter, a rider experiences a pendulum fall, after the belay lines (typically lines) lock at their current length, and the trolley moves rapidly (e.g., at or near the speed of falling) away from the wall. Thus, this is not a conventional and dangerous pendulum fall so assiduously avoided by rock climbers. A conventional pendulum fall may drag a climber into or along the face of a rock formation or climbing wall, banging, scraping, and bruising against protrusions from and the surface itself.

In contrast, in a method and apparatus in accordance with the invention, a fall (dropping the climber in harness in a pendulum fall) swings the climber and harness away from the wall, due to the trolley holding the pivot point or center of pivot and the horizontally remote location of the belay anchor. The harness and climber will thus swing in an arc about the belay anchor like a rope swing on a tree.

Attenuation is best achieved by the trolley following the rider toward the wall after the rider passes bottom dead center (BDC). The trolley may move for a time of about half (30% to 55%) of the time from BDC on the swing outward, and back to BDC on the inward return swing. Additional drops may be added during the swinging by simply moving the trolley toward the rider, on the "inswing" or "outswing," especially outside of BDC.

When the swinging is attenuated sufficiently, the harness may lower to stop the swinging and release the climber. A similar motion may be done by a gondola or vehicle holding multiple passengers, without climbing.

The wall is more suitable, and more realistic if it has a surface containing texturing simulating the surface roughness of rock and "holds" of various sizes and shapes simulating a rock formation. Holds may be grasped or otherwise engaged by hands or feet, some being suitable for both.

A harness, secured to the belay anchor by the line and operable therewith may receive a climber therein. The line (e.g., lines) may thus belay the climber while climbing on the wall. It is especially intended to support the climber oscillating in an arcuate path away from the wall upon falling, by the climber, from the wall.

A control assembly may be operably connected to control a radius of extension of the line between the positioner and the wall. This may by operated, monitored, recorded, and activated automatically. All or part of the activities may be programmatically controlled to respond to sensors, activated buttons, other inputs, or the like. The belay system may be hydraulic to take up the line as a climber ascends, lift to the top when climbing is terminated. It may then "lock off" to remain fixed while trolley movement controls. The belay system or the trolley may act to cause drops and, ultimately, final descent to the "ground." All lengths of trolley lines are best and most precisely controlled by a capstan controlling the lines establishing a trolley's position on its track at all times.

A fall is not necessarily initiated by the climber releasing a grip from the wall, the climber falling from the wall from the force of gravity on the climber's own weight. The belay typically maintains tension applied to and in the line. A belay take-up is operably connected to be capable of automatically retrieving slack created in the line by the climber ascending. In most embodiments, it's unlike conventional "auto-belays" by preventing any paying out from the belay take-up until after completion of the swinging on the line by the climber.

In one embodiment of an apparatus operable as a combined, belayed, climbing wall and swing, the apparatus may include a wall (simulated rock formation) capable of supporting a climber climbing from a starting area proximate a bottom end thereof (e.g., at or near a supporting surface) to a completion area proximate a top end thereof. A line (e.g., lines) operably connect to belay the climber. A first take up is operably connected to automatically take up a portion of the line in response to the climber ascending the wall, and maintain the portion during falling of the climber subsequent to the climbing. A harness, capable of receiving a climber and secures to the line. A carrier (e.g., trolley) positionable to suspend the line to the climber during the climbing and is movable horizontally away from the wall to change falling into swinging.

It may include the carrier, line, and harness together forming a swing capable of swinging the climber away from the wall after the climbing to oscillate about the carrier in a path extending a vertical plane perpendicular to the wall. It may also include a second take up operably connected to move the carrier (trolley) toward the wall to a belay position to effect the belaying during a climb and attenuation after swinging. A controller, operably connected, controls at least one of the first take up and the second take up typically will initiate the falling.

The apparatus may include, typically, a support operating as a track extending perpendicular to a surface of the wall and supporting the carrier (trolley, or other suspension on rigging) continuously between the belay position as a first position proximate the wall and a second position spaced away from the wall as a swinging position capable of supporting the swinging. The carrier typically is or includes a trolley capable of moving along the track in a single dimension while supporting the line suspended therebelow. Also, the line and carrier together define a first path of the climber, along the wall during the climbing, a second path of the climber away from the wall through space during the falling, and a third path of the climber constituting some combination of oscillation, drops, and attenuation of swinging with respect to the carrier fixed thereabove at the second position.

In one embodiment, an apparatus may include first and second take ups operably connected to attenuate momentum of the oscillation by the first take up simultaneously controlling the portion of the line extending from the carrier to the climber while the second take up changes a position of the carrier along the support. The apparatus may include a controller operably connected and to control, and to record data resulting from, operation of the first take up and the second take up. The controller may be computerized (include a processor and programming capabilities) and be programmatically controlled to operate automatically without human intervention during the climbing, falling, and swinging. It may be connected to the Internet to store, process, publish, compare, and otherwise use the data.

The carrier and line may define a fourth path of the climber passing horizontally toward the wall from a midpoint of the oscillation of the climber. The climber may be conducted along the fourth path by operation of the first take up paying out the line to maintain the climber on a level trajectory and operation of the second take up drawing the carrier toward the wall.

An apparatus operable as a combined climbing belay and pendulum swing may typically include a support capable of mounting to extend horizontally away from a top end of a climbing wall; a carrier movable along the support between a first position proximate the climbing wall and a second position remote from the wall; a line threaded over the carrier to extend therebelow and capable of connecting to a harness of a climber; and controls operably connected to be capable of controlling positioning of the carrier and the line to belay the climber during climbing by, fixing the carrier at the first position, and swing the climber away from the wall while falling from the wall, by moving the carrier to the second position, and swinging the climber in an oscillation about the carrier by fixing the carrier at the second position.

The controls include a first take up operably connected to move the line; a second take up operably connected to move the carrier; and a controller operably connected to control operation of the first take up and operation of the second take up. The line extends vertically a distance above a loading surface to the carrier (e.g., trolley) on a track as part of a support capable of supporting swinging by a climber about a location remote from the wall.

An apparatus operable as a combined climbing belay and pendulum swing may typically include a beam on top of a tower, the beam extending horizontally away from a climbing wall. A trolley typically travels along the beam (e.g., along a track supported by a beam) between a first position near the wall and a second position remote from the wall. Belay lines thread over pulleys on the trolley to extend down to clip (e.g., by carabiner) into a harness of a climber. Controls position the trolley (typically fixed during a climb) and take up the belay lines during climbing. Then the belay lifts the climber to the top end of the wall and usually a distance away. The belay system typically "locks off," with the trolley at the first position. The trolley then moves rapidly (e.g., at or near the speed of falling), away from the wall, along the track under any supporting beam, to move the center of pivot of the climber away from the wall during falling from the wall. The trolley decelerates near the second position, swinging the climber farther out in an oscillation, by fixing the trolley at the second position.

The controls include a first take up operably connected to move the belay lines. A second take up moves the trolley over which the belay lines are reeved. A controller controls operation of the first take up and second take up. The lines extend vertically a distance above a loading surface and all operations can be controlled based on the timing at which the belay lines pass bottom dead center BDC.

Certain embodiments of an apparatus in accordance with the invention may include, for example, a sheave positioned above a supporting surface to be movable between a first position and a second position spaced horizontally away from the first position. A first line, having first and second ends is reeved about the sheave between its first and second ends. The line moves the first end between a first level proximate the supporting surface and a second level proximate the sheave in response to taking up the line proximate the second end.

A first take-up is operably connected to selectively take up and pay out the first line from proximate the second end. A mover (such as a trolley or other mechanism) is operably connected to move the sheave selectively between the first position and second position. The first end is arranged to connect to a user to support that user under the first position and to lift the user from the first level and under the first position to the second level and below the second position.

A second take-up is operably connected to move the sheave from the first position to the second position. The first take-up is operably connected to be capable of descending the user by paying out the first line over the sheave. A controller system, whether implemented in hardware, software on a computer, or firmware, is programmed to control the first take-up and the second take-up.

A wall capable of being climbed by a user may be included, extending from the supporting surface to proximate the first position. A controller is programmed to belay a user during climbing of the wall by controlling the first take-up and drive the mover by controlling the mover to maintain the sheave in the first position. The mover may be implemented in a trolley operating along a track extending away from the wall. The sheave is secured to translate with the sheave along the track and to rotate with respect to the trolley. The trolley connects to drive the trolley (with the second line) from proximate the first position, to the second position, and ultimately to a third position at a distal end of the track.

In some embodiments, descending a rider includes dropping the user in a pendulum fall from near the second location, after drawing the user (rider, climber) away from the wall by lifting the user and moving the trolley (and sheave) away from the wall. The controller is programmed to drop the user in the pendulum fall by moving the sheave and trolley from the second position to the third position by controlling the second take-up (typically implemented in a capstan driving the second line). The trolley supports the sheave to render the sheave capable of moving horizontally with it while rotating with respect to it.

The second take-up and second line connect to move the trolley under control of a controller programmed to initiate the pendulum fall by releasing, or even forcing, the trolley from the second position to move rapidly (at about the speed of a person falling) to the third position. The trolley should move fast enough to transition from the fall to a swinging motion without discomfort. That must be less than three "g's" and should be less than 2 g's. It has been found reasonable and reliable to move the trolley at a speed that results in a transition of about 1½ g's applied to a rider in transitioning from the falling portion (arc defined by a changing length or radius of the first line between the rider and sheave) of trajectory to a swinging portion (arc at fixed radius) defined by the line between the rider's harness and the pivot point represented by the sheave on the trolley.

The wall extending from the supporting surface toward the first position, may be supported by a frame or tower, across which passes a support that supports a track. On the track, a trolley supporting the sheave renders the sheave capable of moving horizontally therewith and rotating with respect thereto. The second take-up and second line connect to move the trolley, under direction of a controller programmed to initiate the pendulum fall. It does so through the second take-up, by releasing, driving, or both the trolley from the second position to move to the third position. The second take-up seems to work best when including a capstan operably connected to move the second line to drive the trolley forward and backward between the second and third positions.

The first take-up may be served by a hydraulic hoist, which, during belay, has been found best driven by an accumulator to maintain reliable, timely, and sufficiently precise response to control. The first line connects to a user at or near its first end, its second end connects to the corresponding take-up. Similarly, the trolley is capable of moving sufficiently rapidly from the second position to the third position at a speed effective to reduce a change of acceleration on a user between a falling portion (during which a distance between the user and the sheave increases) of the pendulum fall and a swinging portion (during which the distance remains constant) thereof. Meanwhile, the controller may be programmed to attenuate the swinging portion of a pendulum fall by controlling movement of the trolley to follow the user while the user is swinging away from the third position (back toward the second position).

A method in accordance with the invention may include providing a sheave, a first line, a first take up, and a mover supporting the sheave, far above a supporting surface, where it may translate (move linearly) horizontally between a first position (such as above a climbing wall, although a wall is not required) and a second position spaced horizontally away sufficiently to separate a climber from the wall.

By reeving the first line, having first and second ends, about the sheave, it is capable of moving the first end between a first level proximate the supporting surface and a second level proximate the sheave. Then, by connecting the first end to a user, the first line may be taken in (and up) by the first take-up drawing in the second end. The mover, implanted in any suitable mechanism, shifts the sheave between the first position and second position. The sheave typically rotates on an axle fixed to the mover, which may by a trolley, a slide, or some other translating mechanism. In some embodiments, the mover only needs to move between the first and second positions. In other embodiments, it may move far away from both to a third position.

Lifting the user connected to the first end to near and below the second position, draws a climber upward and away from a terminal position. This may also begin from ground level at the supporting surface, terminating near the second position. In some embodiments a rider may experience a pendulum fall, swinging, and even a programmed trajectory of falls and swings, as well as an attenuation of momentum and kinetic energy of the rider. Finally, the first take-up pays out the first line to descend a rider to the supporting surface.

If a climb is included in the method, then providing a wall capable of being climbed and extending from the supporting surface to proximate the first position will be necessary. For safety belaying the user requires taking up the first line during climbing the wall. The mover, again, may be anything with a short stroke between first and second positions, but may instead be a trolley operating along a track extending horizontally away from the wall;

Descending may include dropping the user in a pendulum fall from proximate the second location. The first take-up typically maintains a length of the first line of fixed length from an initiation of the pendulum fall until an initiation of the descending. Providing a trolley supporting the sheave to render the sheave capable of moving horizontally therewith and rotating with respect thereto actually generates the initiation of the pendulum fall by "locking off" the first line, and then releasing to move, or even driving at a speed rivaling the fall speed of the rider, the trolley horizontally away from the wall. This path runs from the second location to a third location at the distal end away from the wall.

By providing a second line connected to control movement the trolley may be driven between the first, second, and third locations. Providing a second take-up operably connected to control movement of the second line is most precisely controlled by a capstan as part of the second take-up, capable of affirmatively moving the trolley in either direction along the track by wrapping and drawing the second line through the capstan.

The method may include providing a hydraulic hoist as the first take-up, belaying the user during climbing by powering the hydraulic hoist from an accumulator operably connected to provide pressurized fluid thereto, followed in turn by swinging the user following a pendulum fall. Attenuating the swinging may be done rapidly by moving the sheave (on the trolley) toward the second location. Finally the method drops (slowly, at a suitably safe speed) the rider (user, climber) by at least one of moving the sheave farther away from the wall and paying out the first line by the first take-up.

A method may include providing a sheave a first line, having first and second ends, reeved about the sheave to move the first end between a first level proximate the supporting surface and a second level proximate the sheave in response to selectively taking up and paying out the line proximate the second end. The method may provide a first take-up operably connected to selectively take up and pay out the first line.

By providing a mover operably connected to move the sheave selectively between the first position and second position, a user is lifted from a wall and lift the user from a first level, below the first position, to the second level, below the second position, before descending the user to the supporting surface at a position below the sheave. If a wall is included, typically capable of being climbed and extending from the supporting surface to proximate the first position, a user is belayed by taking up the first line during climbing. The trolley operates along a track extending away from the wall, wherein dropping the user into a pendulum fall is effected by moving the trolley and the sheaves is supports from its location near the second position rapidly away to the distal end of trolley track farthest from the first and second position.

The user remains connected to the first end throughout the pendulum fall and swing, which may be controlled into a programmed trajectory of swings, lifts, drops, and attenuation. Initiating the pendulum fall by the trolley moving horizontally away from the wall and the second location to a third location. The lines may be made of synthetic fibers. The belay is best operated monotonically, only taking up the first line, and not any pay out during the climb, and permitting descent only when part of a programmed, trajectory-controlled ride, or when the "ride is over."

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, are not to be considered limiting of its scope, the invention will be described with additional specificity and detail through use of the accompanying drawings in which:

DETAILED DESCRIPTION OF THE PREFERRED EMBODIMENTS

Figure 1:
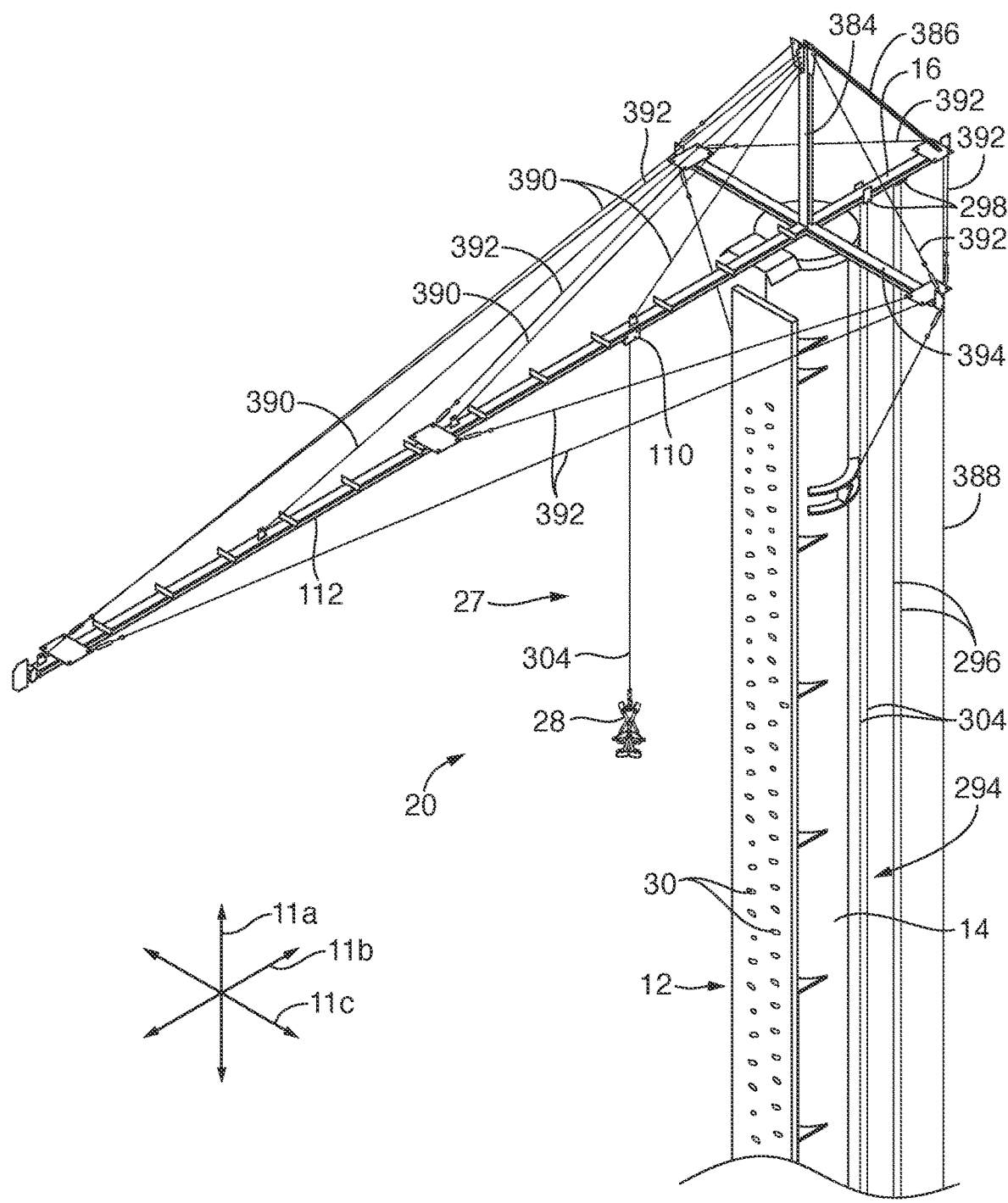
FIG. 1 is an upper, frontal, perspective view of one embodiment of an apparatus and system in accordance with the invention, illustrating a climbing wall, a trolley on a rail, and belay lines that effect belaying a climber as well as a positioning and swinging that climber as a rider upon termination of, or in the absence of, a climbing event, also including the capstan-driven actuation lines or driving lines to and from the trolley and the double belay lines extending upward to be reeved over the trolley, both sets of lines are driven by actuation or take up systems.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, while continuing to refer generally to FIGS. 1 through 12, a system 10 in accordance with the invention may be defined in terms of a direction 11a nominally vertical, a traverse direction 11b nominally toward and away from a wall 12, and a lateral direction 11c sideways and orthogonal to both directions 11a and 11b. A wall 12 may be built on a frame 14 and provided with a beam 16 overhead. The beam 16 overhead will extend perpendicular to a wall 12, (orthogonal), while the wall 12 will typically extend in a vertical direction 11a and a transverse or lateral direction 11c.

A positioner 18 may typically be embodied as a trolley 110. Meanwhile, a swing 20 is configured by various components of the system 10. For example, an individual may begin at a launch deck 24 connected by a line 27 and more properly multiple lines 304 to a harness 28. Typically, the harness 28 is a body harness or full body harness capable of maintaining a rider 60 or climber 60 oriented vertically when supported by the line 27.

In the illustrated embodiment, a wall 12 is provided with holds 30. The surface 32 thereof may be provided with texturing, thus rendering the holds 30 and surface 32 as representing a texture and shape of a rock face. Thus, the system 10 in the illustrated embodiment may represent an artificial climbing wall 12 having holds 30 and a surface 32 mimicking the physical characteristics, grip, and so forth that a rock face might present to a climber 60. Ultimately, the launch location 24 may be on or supported by a floor 44 or a supporting surface 44 near the bottom of the wall 12, or supporting the wall 12 and its frame 14.

In the illustrated embodiment, the wall 12 may be structurally secured to a frame 14, which supports all loads, bending moments, forces, stress, and the like. For example, a trolley 110 operating on a rail 112 or track 112 may be supported by the overhead beam 16 extending outwardly 11b (transversely 11b) from the wall 12. In the illustrated embodiment, the trolley 110 will provide a center of suspension 100 as a belay line 294 (actually double, spread, belay lines 304) passing over pulleys on the trolley 110. Lines 304 extend down some length 102 or radius 102 from the pulley 100 that represents the center of suspension 100 from the trolley 110.

The actual height 104 of the beam 16, or more significantly the trolley 110 and its supporting rail 112 on which it moves, may be from about sixty to six hundred feet. Meanwhile, the radius 102 of swing by a user 60 may be substantially less. Any distance of the trolley 110 defining the center of suspension 100 will be spaced from the wall 12 during a swing. That distance is sufficient to preclude a user 60 from ever striking the wall 12 on any swing path (trajectory).

In the illustrated embodiments, a controller 140 may control the belay take up system 290 and the trolley drive system 292 or take up system 292. A trolley take up system 292 is responsible to control the trolley lines 296, while the belay take up system 290 is responsible to control the belay take up line 294, which actually implement or connect to the spread belay lines 304.

In the illustrated embodiment, which will be explained in further detail hereinbelow, sensors 160 may be positioned to detect the motion, condition, position, speed, or the like, including acceleration, and so forth, corresponding to any component of the system 10. Thus, the trolley 110 may be tracked, the lines 27, 290, 292 may be monitored for position, movement, extension, or the like. Nevertheless, it has been found that basic proximity sensors 160 mounted to detect the position of the lines 27, 304 may greatly simplify the operations of the controller 140 controlling the belay system 290 and trolley system 292.

For example, the sensors 160 if monitored according to a program in a computerized controller 140 may detect the moment at which any line 27, 304 arrives at a vertical position. By timing the elapsed time between vertical orientations of the lines 27, 304, the controller 140 may calculate various parameters (e.g., suitable fractions of the time) reflecting suitable control of motion of a rider 60, suspended by the lines 27, 304. Thus, control systems 140 may very quickly calculate parameters needed for controlling such operations such as attenuation of swinging by a rider 60.

In a related scenario, the sensors 160, by detecting the times at which the lines 27, 304 pass through a vertical orientation, may accommodate wind, weight, bulk, and other factors that should be accommodated in rider-influenced dynamics of the system 10. For example, mass increases as a third power of distance. For example, the mass of a sphere increases with the third power of the radius. However, cross-sectional area varies as the square of the radius. Thus, for example, a sphere or a rider 60, will tend to increase air or wind drag on a body with the increase in surface area proportional to a square of radius.

Meanwhile, mass and momentum, including the effects of gravity and gravitational acceleration, will change as a third power of radius. Thus, air drag is not proportional to mass but gravitational attraction is proportional to mass. All of these parameters need not be accommodated in certain embodiments of system 10 and methods 330 in accordance with the invention. All of these parameters contribute to the time required for a rider 60 to pass from a vertical position on an outward trajectory away from the wall 12 and back inward toward the wall 12 of a returning trajectory.

Thus, wind, weight, size, air drag, gravity, and so forth are all accommodated in that time parameter. Accordingly, a system 10 in accordance with the invention may rely on that time. Some fraction thereof will predict a continuing inward trajectory toward the wall 12 in an arcuate swing path. Thus, attenuation processes may take place based on clock times, which are themselves based on elapsed times between subsequent vertical positions of the lines 27, 304.

In FIG. 1, a vertical strut 384 extends in a vertical direction 11a from the top of the tower 14 or frame 14. Likewise, an anchor strut 386 or anchor brace 386 extends downward from the vertical strut 384 to secure rigidly to the back end of the beam 16 overhead. Meanwhile, a vertical guy line 388 extends from a position secured to the back end of the beam 16 to an anchor secured to the earth, such as by a large and permanent fixed object, such as a concrete block, to a footing or foundation, or the like. Thus, tension in the vertical guy line 388 holds down the back end of the beam 16, forming a "couple" (torque) with the upward force of the tower 14 and the vertical strut 384.

With this anchoring in place, a set of vertical-plane guy lines 390 extend from their clevised securements to the top of the beam 16. These extend up to the top of the vertical strut 384. Thus, the "load path" of a rider 60 (e.g., user 60, climber 60) extends up through the lines 304 constituting the belay line 27 through the trolley 110 and ultimately through the rail 112 to the beam 16. The load of the rider 60, trolley 110, rail 112, and beam 16, is then carried vertically by the vertical plane guy lines 390. Ultimately, this cable-and-beam structure provides a comparatively lightweight, but structurally adequate, support for all vertical loads supported by the frame 14 or tower 14.

In a similar manner, in a horizontal plane defined by directions 11b and 11c, horizontal plane guy lines 392 or simply horizontal guys 392 pass from their clevised securements to the beam 16 inward 11b and laterally 11c to secure at the outer extremities of lateral struts 394. Thus, the beam 16, rail 112 and trolley 110 are securely positioned against excessive deflection in both vertical 11a and lateral 11c directions. Similarly, due to the angled vectors presented by the vertical-plane guy lines 390 and the horizontal plane guy lines 392, with their opposing struts 384, brace 386, tower 14, and vertical guy line 388 secure the rail 112 and beam 16 in all three dimensions.

Meanwhile, sheaves 398 or pulleys 398 are provided, over which are reeved the belay lines 304 and the trolley lines 296. Nevertheless, the trolley lines 296 operate best in a different manner from the belay lines 304. For example, both the belay lines 304 pass in the same parallel direction (more or less) along their entire lengths. In contrast, the trolley lines 296 move always in opposite directions but parallel to one another.

This is because the belay lines 304 provide stability to a user (anti-twist) by their being spread apart. The trolley lines 296 are connected to opposite ends or sides of the trolley 110. One line direction draws the trolley 110 out toward a maximum extension position at the far forward end (away from the frame 14 or tower 14) of the beam 16. The other line 296, moving in the opposite direction, draws the trolley 110 back toward the wall 12 and the frame 14.

Figure 2:
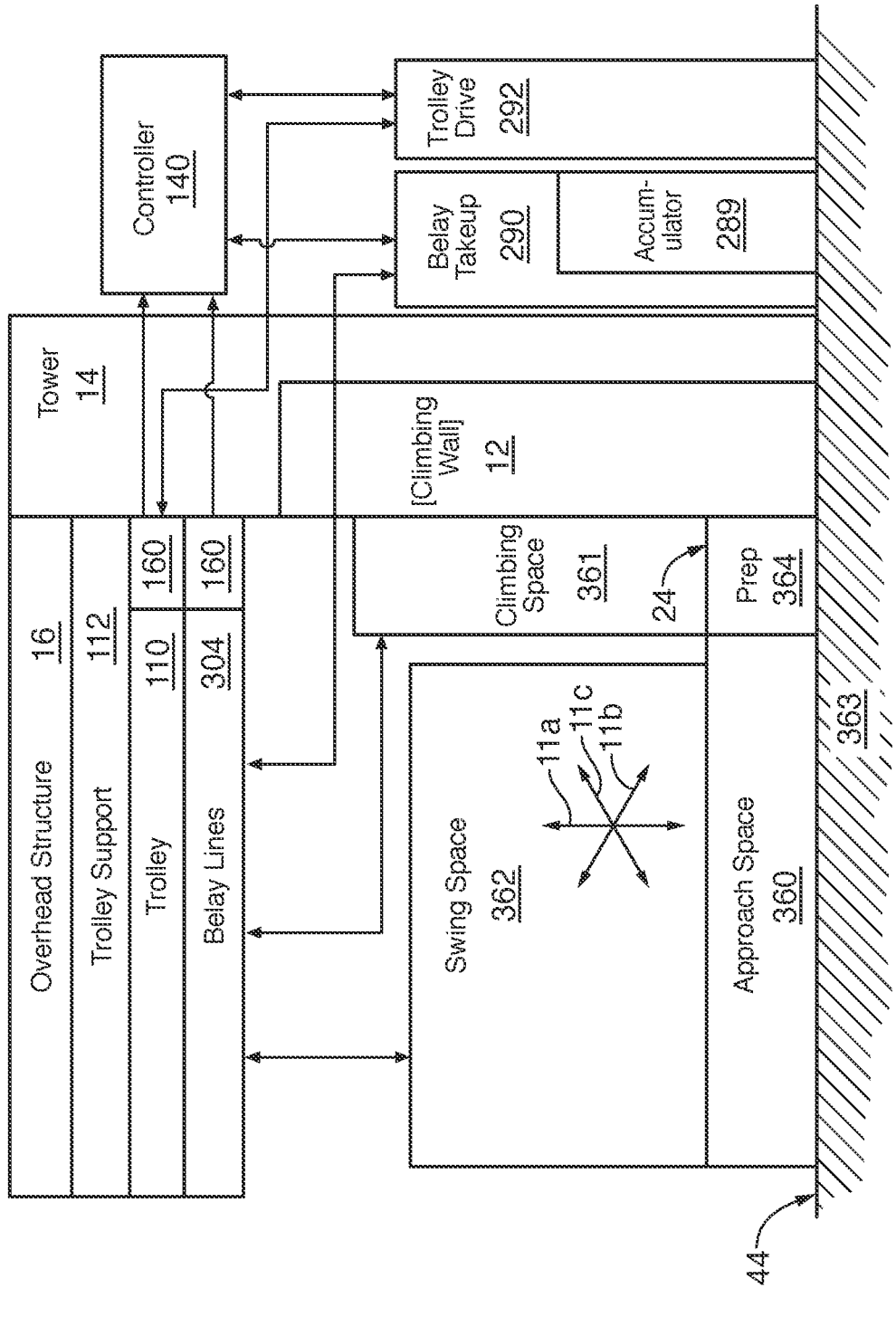
FIG. 2 is a schematic block diagram of a system in accordance with the invention illustrating the functionality and structures for a system operable in accordance with the various embodiments of apparatus and methods in accordance with the invention.

Referring to FIG. 2, while continuing to refer generally to FIGS. 1 through 12, a system 10 may include various components supported by a supporting material 363 defining a supporting surface 44. For example, a supporting surface 44 may represent a floor 44 on a concrete pad, floor inside a building, patio or deck 44 in an outdoor environment, or simply the ground 44 supported by underlying soils 363.

In the illustrated embodiment, a tower 14 represents or acts as a frame 14 supporting a climbing wall 12. Outward 11b from the climbing wall 12 may be a climbing space 361. That is, this is the space 361 in which a climber 60 or rider 60 may ascend the wall 12 with its associated holds 30 and textured surface 32.

Those belay lines 304, corresponding to the line 27 generally, will extend down into the climbing space 361 selectively. Meanwhile, those belay lines 304 are controlled by a belay take up system 290. In certain embodiments, that belay take up system 290 may have an accumulator system 289 that operates to provide a constant pressure in the take up system 290 in order to continually belay a climber 60. Similarly, a trolley 110 operates on a track 112 extending along the beam 16 operating as an overhead structure 16. Of course, sensors 160 may monitor motion, distance, timing, or the like for the trolley 110 and the belay lines 304. Sensors report to the controller 140, which will then control the belay take up 290 and trolley drive 292.

Away from the climbing wall 12 and the climbing space 261, a swing space 362 is provided free from any possible collision by a rider 60 with the wall 12 and clear of an approach space 360 and preparation space 364 in the launch area 24 of the system 10. Thus, the climber 60 may enter an approach space 360 to close out a ride or begin a ride. A belay system 290 will position the belay lines 304 in the prep area 364 in order to harness up and clip in a rider 60 at the launch area 24.

The belay lines 304 may be taken up by the belay take up 290 a distance sufficient to test the weight (e.g., 50 #<wt.<300 #) of a rider 60. When satisfied, the controller 140 may permit the rider 60 or climber 60 to then ascend the wall 12 within the climbing space 361. Following termination of the climb within the climbing space 361, the belay lines 304 may be taken up, and the trolley 110 may be spaced some distance away from the wall 12. Thus, the rider 60 or climber 60 is lifted up and away from the wall 12 to a standard swing starting position spaced from the wall 12. The distance is selected to preclude any striking against the wall 12 or the holds 30 mounted to its surface 32 during any swinging motion.

In one currently contemplated embodiment, the trolley drive 292 may be hydraulic. However, it has been found that a capstan system 292 operates to solve several difficulties. For example, abrupt changes in g-forces or accelerations may impose on a rider during a swing and fall procedure. Likewise, rapid and precise movement and stopping of the trolley 110 by the trolley drive 292 has been found to be better served by a capstan. It provides more precision and a reduced reaction time, than does a hydraulic take up system. Hydraulic drives are completely suitable for the belay take up 290.

Figure 3:
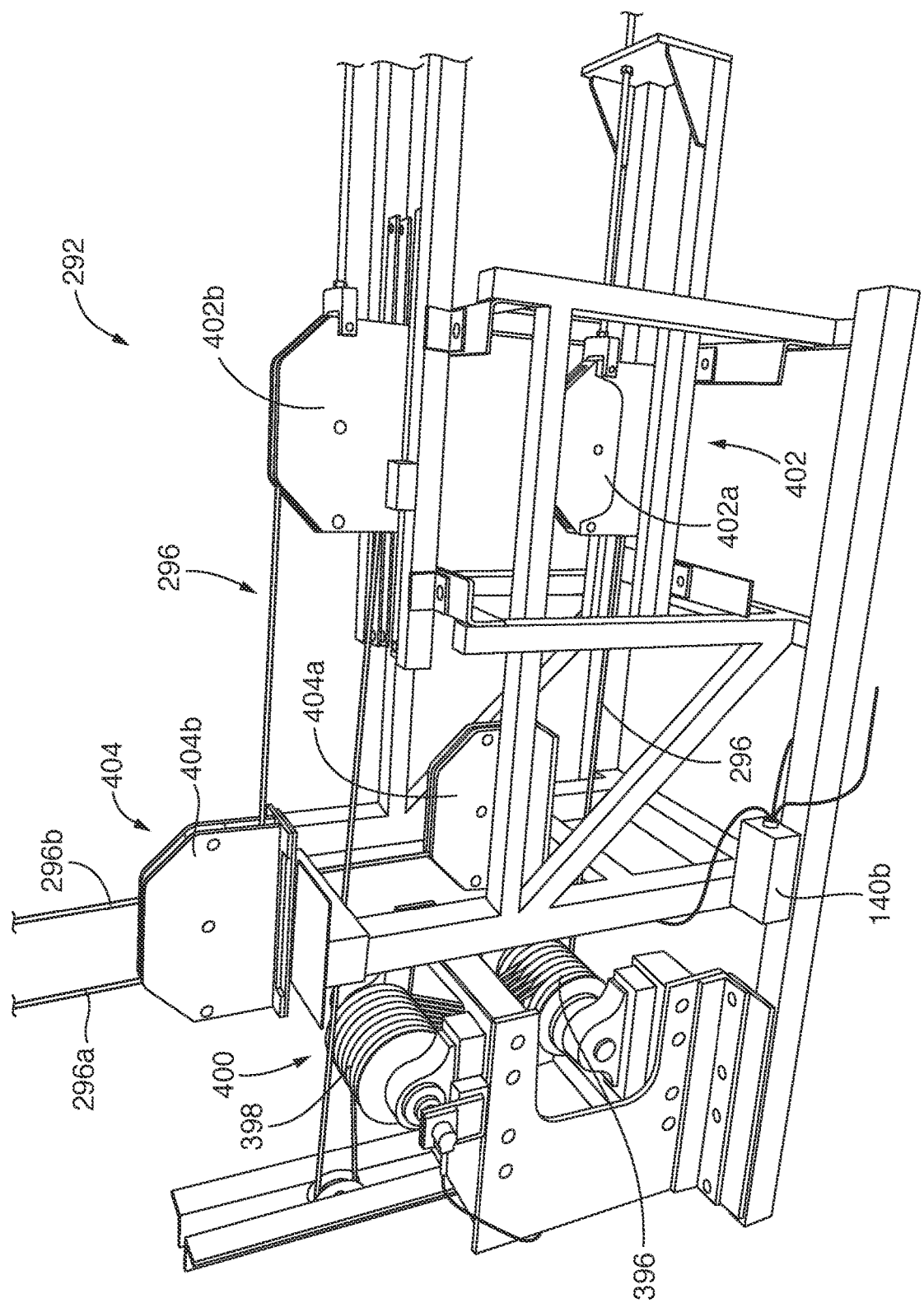
FIG. 3 is a perspective view of one embodiment of a drive system for a trolley, involving a capstan in order to provide the speed and precision that will provide a suitable control of motion of the trolley in accordance with a method in accordance with the invention.

Referring to FIG. 3, a system 10 in accordance with the invention may rely on a capstan drive 292 as a trolley take up system 292. Notwithstanding the utility of hydraulic systems to provide a distance multiplier (e.g., multiple sets of sheaves as a hoist) on a hydraulic ram, inertia, time delays, inaccuracies due to air bubbles in liquid flows, and the like contribute to imprecision in timing distance. This imprecision is not sufficiently meaningful to influence unduly the belay take up system 290.

However, the take up system 292 for the trolley 110 is quite another matter. It has been found that speed and precision, as well as control of acceleration and deceleration may greatly benefit operation of the trolley 110. Accordingly, in the illustrated embodiment, a trolley take up system 292 may most effectively operate when driven by a capstan 400 driving the line 296. Two legs 296a, 296b of the line are reeved upward from the drive 292 to pass out to the trolley 110, being reeved from both ends of the beam 18. As a practical matter, the trolley 110 operates best on a rail 112 or track 112 supported and suspended under the beam 16.

Referring to FIG. 3, in one embodiment of a trolley drive 292 or trolley take up system 292, a capstan 400 may be used to drive the line 296. Accordingly, the line 296 may leave the drive system 292 as two legs 296a, 296b. Each of the legs 296a, 296b will be secured to an opposite end measured in the in-and-out direction 11b. Thus, drawing on one of the legs 296a, 296b will draw the trolley 110 in the direction of the force applied thereto. Meanwhile, the opposite line leg 296b, 296a will then be paid out by the trolley drive 292 to permit it to follow the trolley in the direction to which it is being drawn.

In order to manage the mechanics of this drive system 292 serving the trolley 110, drive sheaves 396 forming the capstan 400 are wrapped with the trolley line 296. However, the capstan 400 benefits from the additional friction from tension provided by idler sheaves 398. The idler sheaves 398 may be formed from a single piece of metal, such as a suitable steel. Likewise, the drive sheaves 396 may be formed of a single homogenous mass of steel or the like.

Meanwhile, the line 296 is reeved around the sheaves 396, 398 in a "FIG. 8" configuration. Also, although capstans 400 may generally include a single reeving about a single sheave, the need for a secure frictional engagement between the sheaves 396, 398 and the line 296 militates for multiple reevings around multiple sheaves 396 in a bank. Similarly situated is the bank of idler sheaves 398. Typically, about six to eight sheaves 396 and a corresponding number of sheaves 398 will typically be appropriate to maintain effectively zero slippage of the line 296 on the sheaves 396, 398.

A reason for the multiple reeving around the sheaves 396, 398 is accumulated frictional engagement. It is well understood that friction force is equal to a coefficient of friction, unique to any pair of materials in contact, multiplied by the "normal" force perpendicular to the frictional surface. Thus, the normal force is applied in a radial direction and the frictional force is resolved into a circumferential direction on each of the sheaves 396, 398. By maintaining a proper tension (force) in the line, each wrap or reeving of the line 396, 398 results in the transfer of frictional force. Thus, a motor 397 driving the drive sheaves 396 maintains sufficient tension to render slippage insignificant.

To maintain tension in the line 296, each leg 296a, 296b may be served by a corresponding and respective tensioner 402a, 402b. The tensioners 402 assure that any stretch, shrinkage, slippage, distortion, or other source of lengthening or shortening of the line 296 is incapable of significantly altering the tension force in the line 296. In order to direct the legs 296a, 296b line 296 upward toward the beam 16 and the sheaves 298 directing those legs 296a, 296b to the trolley 110, director sheaves 404a, 404b or director pulleys 404a, 404b may change the direction of the legs 296a, 296b from horizontal to vertical as illustrated. Meanwhile, a suitable controller 140b on the motor 397 provides both a forward and backward movement of the line 296 about the sheaves 396, 398.

Figure 4:
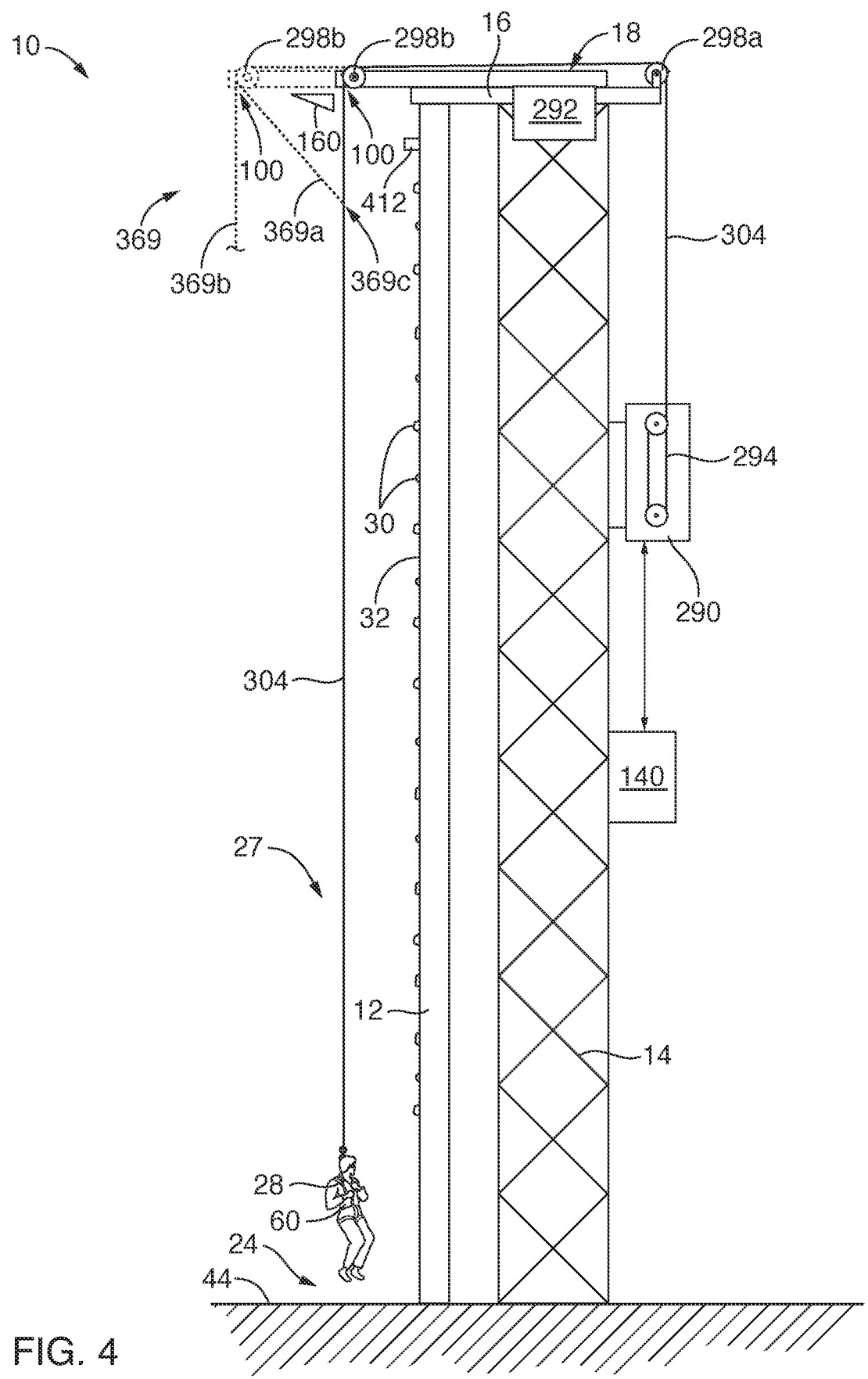
FIG. 4 is a side, elevation view of one embodiment of a system and method in accordance with the invention.
Figure 5:
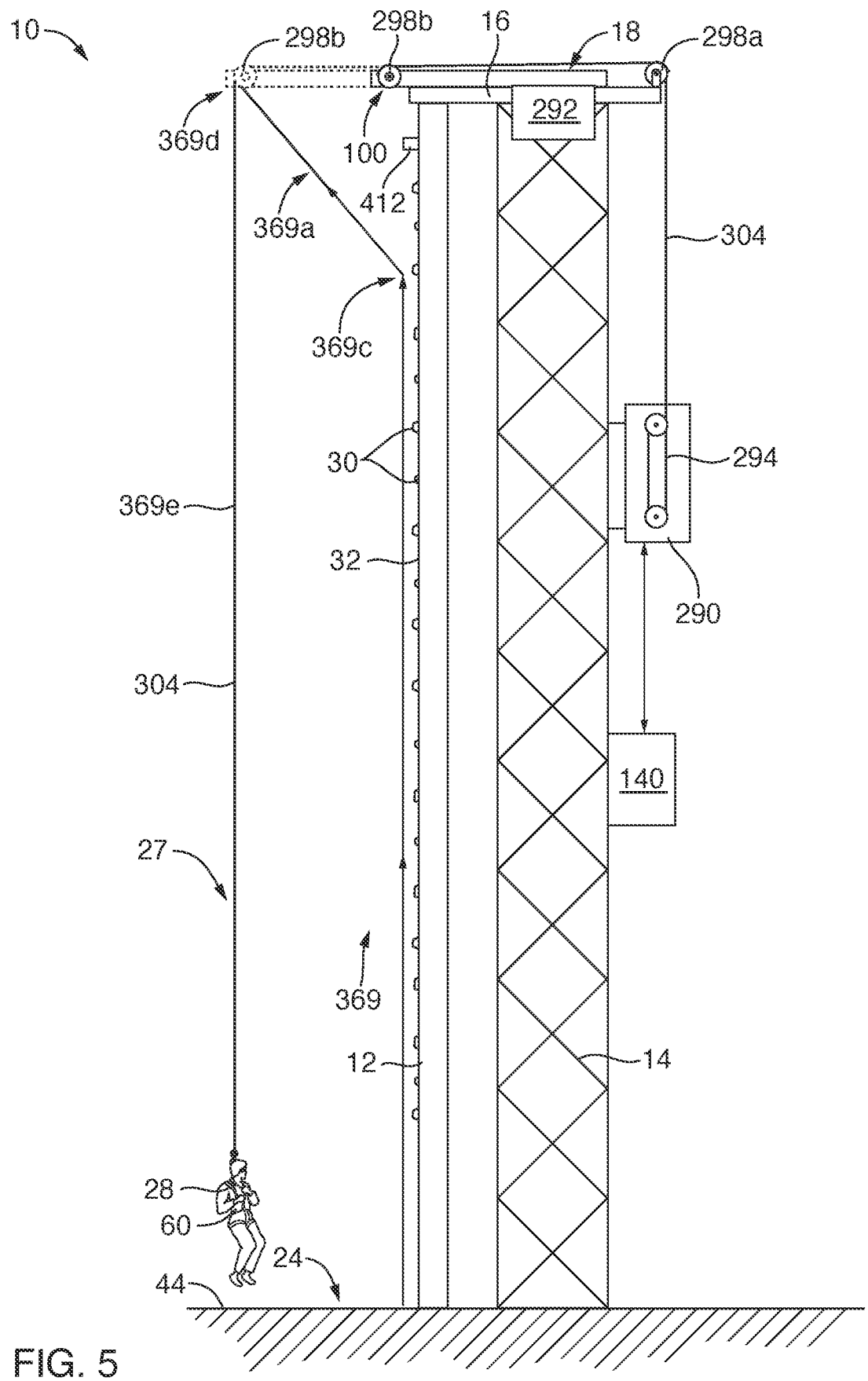
FIG. 5 is a side, elevation view of the system of FIG. 4 illustrating the path and its significant segments during execution of a method in accordance with the invention.

Referring to FIGS. 4 and 5, in one embodiment of a system 10 in accordance with the invention, a wall 12 may be supported and rigidized by a frame 14 of any suitable type. A front surface 32 of the wall 12 may be provided with holds 30 secured thereto. Meanwhile, the surface 32 itself may be textured to represent a surface of rock. Likewise, the holds 30 may be shaped and textured to represent typical protrusions that may extend from natural rock and serve as hand holds or foot placements in climbing the wall 12 as a synthetic or artificial rock formation.

In this particular embodiment, the lines 304 may be reeved over pulleys 298 or sheaves 298 secured to a movable beam 18. A positioner 18 moves the suspension point or center of suspension 100 toward or away from the wall 12. The positioner 18 may move with respect to a supporting beam 16 extending across the top of the frame 14 and the wall 12. In this embodiment, the belay system 290 may be secured to augment a more-or-less conventional climbing wall 12 to provide a belay function to a climber 60 in a harness 28.

In this embodiment, the stroke or the movement by the positioner 18 need only be sufficient to separate a climber 60 from the wall 12 sufficiently to preclude an inexperienced climber 60 from bumping against the holds 30 protruding from the wall surface 32. For example, the drive 292 may be of any suitable type, and need not be as complex as the capstan 400 discussed hereinabove. A simple drive, such as many of those described in the references incorporated herein by reference may operate to move the positioner 18 with respect to the beam 16 to effect motion of the sheave 298b away from the sheave 298a.

Thus, the need for an attendant may be seriously reduced if not eliminated by providing a belay take up system 290 and a drive 292 that can operate substantially automatically or programmatically. A controller 140 may process instructions based on data picked up from sensors 160 detecting positions of, for example, the lines 304, the positioner 18, or the like. The positioner 18 may be a trolley 110 but need not be so complex. For example, a hydraulic ram, a ball screw, a lever, a rocker, a single or double arm having two positions, or the like may provide the extension of the forward sheave 298b from a position close to the wall 12 to a position clear of the wall 12, or clearing the climber 60 from the wall.

A climber 60 may approach the wall 12 at a launch area 24 or loading area 24 near a floor 44 or supporting surface 44. The belay take up system 290 may retract the lines 304 following a climber 60 beam clipped in by a harness 28 to the lines 304. The belay take up 290 may be programmatically controlled by the controller 140 to retract the lines 304 sufficiently to weight the lines 304 with the full body weight of the climber 60 and the harness 28. If the climber 60 is within the weight range permitted, typically between 50 and 300 lbs., then the system 10 may indicate that the climber 60 is on belay and free to climb.

In certain embodiments, an initial distance above the reach of the climber 60 may be provided with no holds 30. Therefore, a climber 60 may be checked to make sure that the weight of the climber 60 does not register as zero. Zero means the climber 60 and harness 28 are not properly clipped into the lines 304.

Ultimately, the climber 60 may climb using the holds 30 along the surface 32 of the wall 12. Meanwhile, the belay take up system 290 may retract the lines 304 by applying a modest load, such as from about ten to about twenty five pounds of force on the harness 28. In one presently contemplated embodiment, the take up 290 will not reverse direction. That is, a climber 60 and harness 28 will not be permitted to descend upon releasing the holds 30, falling, tiring out, pushing away from the wall 12, or the like.

This is for specific reasons some of which include the protection of a climber 60 against striking or engaging in any way the holds 30 on descent. Also, by not reversing direction, the lines 304 may permit a climber 60 who has not "timed out" to continue climbing after resting, after falling, after disengaging from the holds 30, or the like.

Meanwhile, the climb may end in several ways. For example, the climber 60 may fall or lose grip on the holds 30. However, the belay take up 290 preferably does not permit falling any significant distance downward. Also, a climber 60 may ascend to a position near the top of the wall 12 and strike an indicator 412 or actuator 412 indicating successfully completing the route defined by the holds 30. Likewise, a young, weak, or slow climber 60 may eventually simply ascend so slowly that some predetermined time is passed causing the controller 140 to engage the take up system 290 to retrieve the lines 304.

Thus, there comes a point at which a user 60 arrives at a position 369 where the climb terminates. Then, the belay lines 304 may provide a lift or bump such as a slight release or a slight tug to inform the climber 60 that the climb is over. The lines 304 are about to be drawn out along a path 369a followed by a descent path 369b. To that end, at a location 369c, a signal may be given through the lines 304 to a climber 60.

Next, the extension of the carrier 18 or positioner 18 may move outward 11b drawing the climber 60 upward in the direction 369a closer to the track 112 by virtue of the lines 304 having to take up in order to provide the extra length needed to extend from the rear sheave 298a to the now forwardly displaced forward sheave 298b.

Ultimately, the program in the controller 140 may command the take up system 290 to extend the lines 304 or pay out the lines 304 along the path 369b to descend the climber 60 back to the supporting surface 44. Note that a reference numeral herein with a trailing letter is simply an instance of the item identified by that number.

Referring to FIG. 5, the path segments 369 may basically correspond to the supporting surface 44, ascending along the wall 12 to the terminal position. Thus, the pull off path 369a results as the belay lines 304 are taken up by cause of the moving forward of the forward sheave 298b, extending the distance between the forward sheave 298b and the rear sheave 298a. Thus, the climber 60 follows a path something like the pull off path 369a.

Once a climber 60 is clear of the wall 12 and sufficiently distanced to preclude danger of injury by contact with the holds 30, the lines 304 may descend toward the supporting surface 44. One may see that such a system 10 may be implemented using a conventional wall 12 retrofitted with the positioner 18 as a trolley 110, hydraulic ram, or other actuator. In certain embodiments, having a moving positioner 18 may not be required. For example, if the forward sheave 298b simply maintains its position, the speed of descent may be controlled by the controller 140 to be sufficiently slowly that the climber 60 has plenty of time to push away (rappel) from the wall 12 and holds 30 even without any previous experience.

Figure 6:
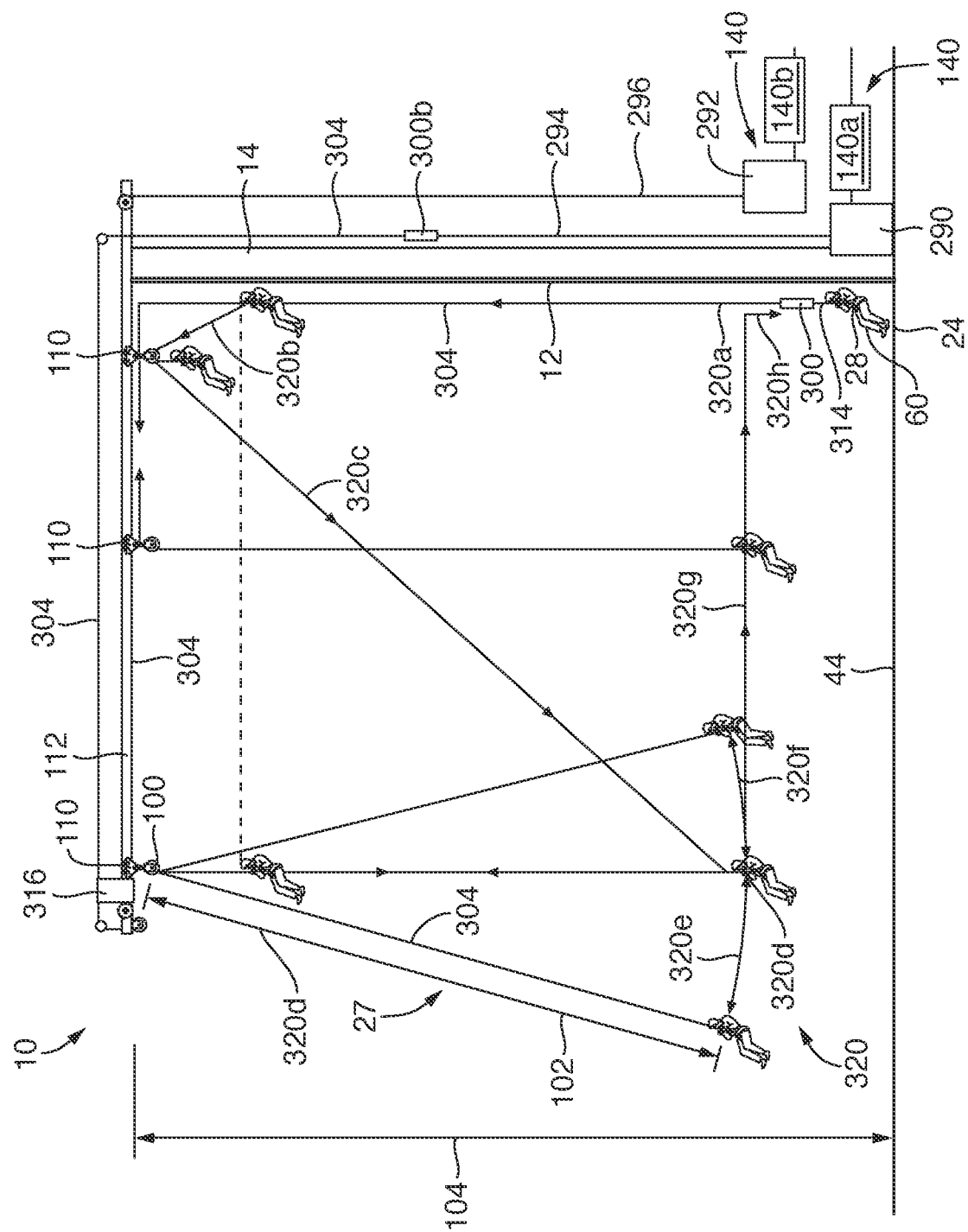
FIG. 6 is a side, elevation view of an alternative embodiment of a system in accordance with the invention, wherein a comparatively large motion of the trolley carrying belay lines is used to induce a pendulum fall and swing method in accordance with the invention.

Referring to FIG. 6, operation of a system 10 in accordance with the invention may rely on a climber 60 approaching a climbing wall 12 into a launch area 24. The climber 60 has previously donned a harness 28. That harness 28 is then typically clipped to a sling 314 interposed between the harness 28 of the climber 60 and the spreader 300 connected to the double lines 304.

A harnessed climber 60 or rider 60 may follow a path 320 in parts. The controller 140a for the belay take-up 290, and a controller 140b for the trolley take-up 292 may be programmed to provide multiple modes of operation.

For example, during climbing, a climber 60 is belayed on the sling 314 under the spreader 300 connected to the lines 304 being taken up by the belay take-up system 290. Typically, programming the controller 140a will provide a slight tension (force of a few pounds or kilograms) in the lines 304. The force may be sensed by a typical sensor 160a, 160b against a line 294, 296, 304. Position may be sensed at a block 306b, 306d.

As the climber 60 scales the wall 12 along a path segment 320a, the lines 304 are taken up and maintained in a slight tension (sufficiently small to not cause discomfort or instability for a climber 60) by the belay take-up system 290. If, at any point, the climber 60 falls from the wall 12, the belay lines 304 have already been taken up slack. They will simply maintain their position by control exerted by the controller 140a controlling the belay take-up 290.

If the climber 60 does not fall, then the climber 60 may continue to ascend the wall 12 to eventually approach the trolley 110 overhead above the climber 60. A climber 60 will ultimately execute one of several actions. First, the climber 60 may reach the top end of a wall 12, in close proximity to the trolley 110.

A second possible consequence is that the climber 60 may ascend to the top of the wall 12 and strike a button 412 or other sensor 412 (see FIG. 4) that tells the controllers 140a, 140b that the climber 60 has completed the climb. A third possibility is that the climber 60 may stall. A climber 60 may become tired. One 60 may reach an altitude at which certain of the climbing holds 30 on the wall 12 are no longer accessible or navigable for the skill level of that climber 60. By whatever cause, the climber 60 effectively stalls out short of achieving a target location near the top of the wall 12.

As mentioned hereinabove, the climber 60 may slip and fall from the wall 12. Even if a climber 60 is making steady progress or unsteady progress upward along the wall 12, a predetermined time limit may be required to be met. Thus, a system 10 may simply time out. The controller system 140, meaning either or both of the controllers 140a, 140b, may be informed of that fact by sensors 160, including clocks 160, thus proceeding independently from others' intentions.

By any of the foregoing termination modes, a climber 60 may be drawn along a path 320b by operation of the belay take-up 290 retrieving in the lines 294, 304, the trolley 110 retreating slightly, or both, to some predetermined distance or position. At this point, the belay lines 294, 304 will remain fixed at their lengths, while the controller 140b of the trolley take-up system 292 will release the line 296 at a predetermined rate as determined suitable, as will be discussed hereinbelow.

Accordingly, the trolley 110 may be effectively free to traverse along the track 112 away from the wall 12. The trolley 100 may even effectively free wheel at whatever speed the weight of the climber 60 may dictate. However, it has been found more suitable for the controller 140b to programmatically drive the speed at which the trolley 110 retreats away from the wall 12 as fast as practical. A technical analysis may determine an appropriate speed, typically the speed of the fall of the climber 60 along the path 320c. The speed may slow to dampen or smooth a transition from the falling trajectory 320c to the swing trajectory 320e, 320f. The fall path 320c may thus be carefully controlled, programmatically controlled along a certain trajectory 320, or may simply be dictated by free fall of the climber 60 at whatever speed the lines 304 may pass over the trolley 110 or its pulleys 302 as the climber 60 falls.

A tangent point 320d is a point 320d at which the trajectory 320c of a climber's fall intersects with a tangent of a path 320e. For example, in certain embodiments, the entire path 320c may be a swinging pendulum fall 320c. In this embodiment, it need not be.

One will note that the tangent point 320d may represent a comparatively abrupt change in direction. Programmatically controlling the speed of the trolley to begin fast and slow during the last foot or so of motion urges freefall followed by easing into the swing are 320e, 320f. Swinging along the forward path 320e or the backward path 320f with respect to the trolley 110 directly thereabove is driven by the fall of the climber 60 and the release of the trolley 110 by the trolley take-up system 292. That path pair 320e, 320f forms a simple arc at a radius determined by the lines 304.

In the illustrated embodiment, the fall path 320c need not be vertical nor completely semicircular. Rather, the path 320c is usually something in between. Accordingly, a change in direction may need to occur as the fall path 320c intersects the swing path 320e at a tangent point 320d. The tangent point 320*d* is a point 320*d* at which a tangent from the arc 320*e* will intersect the fall path 320*c*.

Back to the issue of the change in direction, the abruptness may be solved or remediated programmatically by control of the trolley 110 through the trolley take-up system 292. Alternatively, or in addition, programmatic controls may release or pay out the line 294 by the belay take-up system 290. Other absorption mechanisms may include, for example, a spring mechanism 316 or attenuator 316 of another type.

The trolley 110 may abut or impact directly against an attenuator 316 positioned at its end-of-stroke position. An attenuator 316 may be one of several varieties. For example, a hydraulic damper, a spring, a complex system of springs of engineered stiffness may be installed. Such may ensure that the trolley 110 is free to move horizontally against a spring 316 resistance, thereby releasing a certain additional length of the belay lines 304. This results in a vertical spring effect on the climber 60.

In some embodiments, the harness 28 or sling 314 may produce certain spring effects. An elasticity of "dynamic line" or the like may permit a reduction of shock by extending the time during which forces on the climber 60 are remediated. Typically, discomfort results if more than three "g's" of acceleration (deceleration) occur (3× gravitational acceleration).

Thus, the speed of the trolley 110 may be moderated by the trolley take-up 292. Payout of the belay lines 304 may be moderated by the belay take-up system 290 may occur instead or in addition. Alternatively or in addition, some type of an attenuator 316 may simply take up the load elastically, with or without some amount of damping. Something as simple as a spring 316, which the trolley 110 may deflect, may provide sufficient remediation of the impact forces caused by the change of direction between the fall path 320*c* and the swing path 320*e*. Speeding the trolley 110 outward rapidly has shown to solve the transition problems of forces at the tangent point 320*d*.

One way to quickly dampen any swinging motion by the climber 60 from the trolley 110 is to follow the rider 60, move the trolley 110 toward the wall 12 during the back swing path 320*f*. For example, the trolley 110 may remain fixed for some number of oscillations of the climber 60 along the paths 320*e*, 320*f*. After a predetermined time, the trolley 110 may move toward the wall 12 in coordination with travel along the path 320*f*. Thus, force or momentum necessary for oscillation is not reintroduced to the climber 60 (e.g., not recovered from the potential energy of altitude) and the trolley 110 above the rider 60 will not vector any horizontal pull away from the wall The trolley 110 moving toward the wall 12 while additional line 304 is fed out, at the proper time and position will basically remove the force that would impart momentum. This leaves a climber 60 without the momentum or force to continue the former oscillation.

Ultimately, the trolley 110 will typically move along the path 320*g*, carrying the rider 60 parallel to the surface 32 and toward the original launch positon 24. Upon arrival close to the wall 12, the belay controller 140*a* may programmatically pay out the line 294 and lines 304 in order to lower the climber 60 to the surface 32 along the path 320*h*.

The controller 140 controlling the take-up system 290 may be programmed to pause awaiting an instruction.

Figure 7:
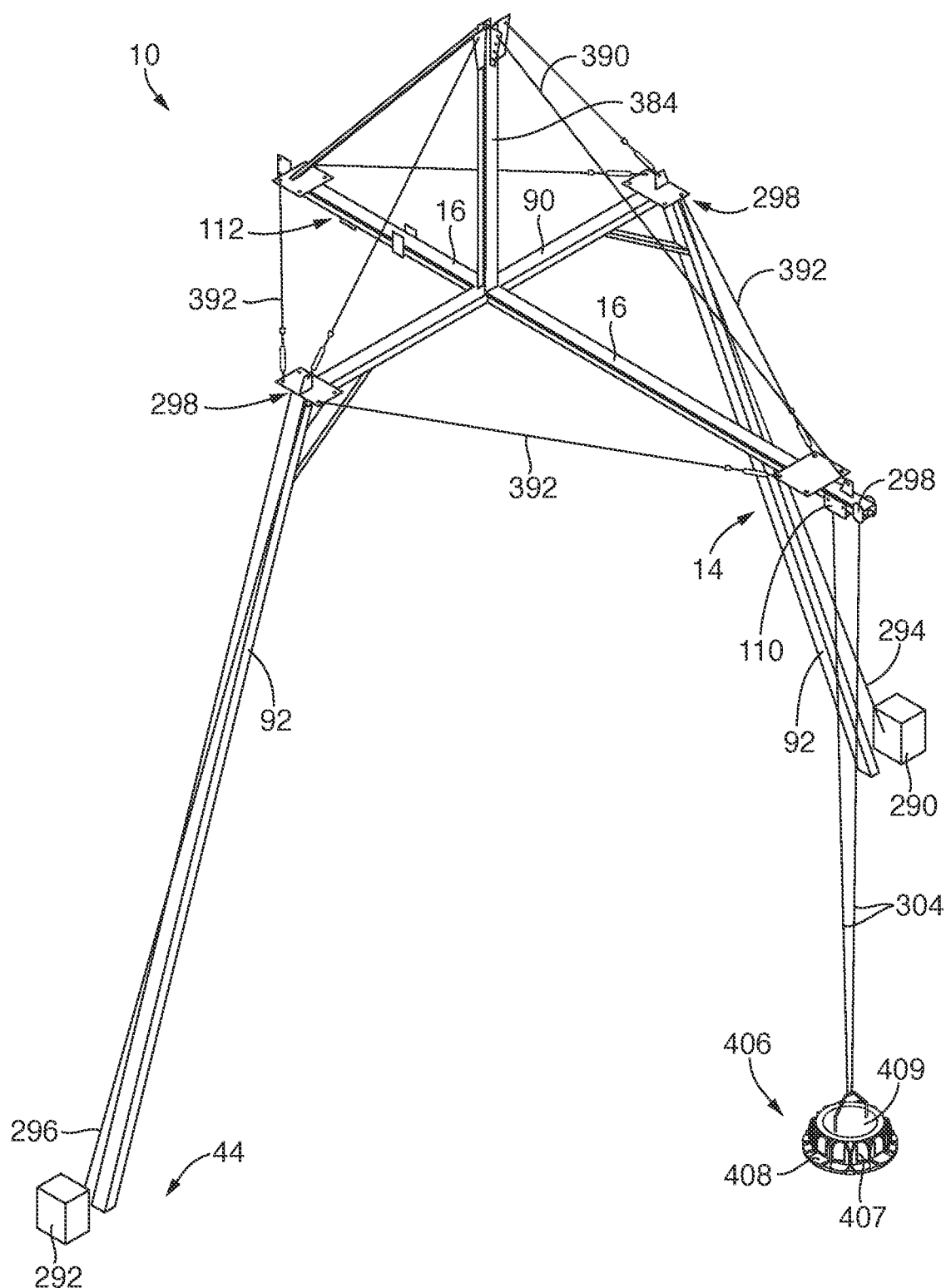
FIG. 7 is a perspective view of yet another alternative embodiment of a system in accordance with the invention, this one capable of operating with or without a climbing wall, and thereby being capable of inducing a swing, initiating a fall or drop, and even repeating drops, swings, or both in a programmed manner.

Referring to FIG. 7, yet a third alternate embodiment of a system 10 in accordance with the invention may include a frame 14 constituted by, for example, pillars 92 extending from an anchored location within the ground or some supporting surface 44 upward to terminate in a fixed connection with a cross beam 90. In certain alternative embodiments, the pillars 92 may be single, tubular structures having suitable strength and stiffness. In other alternative embodiments, a latticed, trussed structure 92 may serve. In yet another embodiment, multiple pillars 92 extend upward toward the cross beam 90 in order to provide the best, engineered strength, stiffness, deflection, and the like.

Similarly to the discussion hereinabove, the cross beam 90 may support a beam 16 extending at a distance normal (perpendicular) to the cross beam 90. Similarly, a vertical strut 484 may extend above the cross beam 90 to support vertical guy lines 390 as well as horizontal plane guy lines 392. Thus, the beam 16 supporting a track 112 or rail 112 supporting a trolley 110 may be fixed in a substantially rigid position. That is, all materials, even solids, even in a completely fixed position will respond to a force. Larger force causes a larger deflection (distortion, bending, etc.). However, in the illustrated embodiment, the trolley 110 may be driven through a series of paths for the line 296 driven by the trolley drive 292, such as a capstan 292 through a suitable number and orientation of pulleys 298 or sheaves redirecting the line 296 up the pillars 92 and across the cross beam 90 to divide and deploy across further sheaves 298 at opposite ends of the track 112 of the trolley 110.

Similarly, belay lines 294, 304 may suspend from the trolley 110 to an individual harness 28, gondola 406 or a vehicle 406, such as a cart 406 provided with seats 405 for multiple riders 60. In the illustrated schematic, a belay line 304 may divide into the multiple belay lines 34 in any suitable manner, depending upon the reeving of the lines 294, 304 through suitable pulleys 298 or sheaves 298 in order to direct the lines 304 properly.

In this configuration, movement of the trolley 110 along the track 112 may be used to induce motion. On the one hand, the lines 304 may be reeved to extend from one end of the beam 16 to the opposite end. Thus, just as in FIG. 6, the vehicle 406 may receive passengers 60 in the seats 408 locked into their seats 408. A suitable lock 407, such as a yoke 407 may extend from above and behind the shoulders of a user 60 down to secure legs and torso into the seat 408 to be unable to accidentally dislodge.

Meanwhile, the gondola 406 may include a center core 409 about which the seats 408 may rotate. Accordingly, the lines 304 may secure by suitable fasteners to the core 409, while the seats 408 or that portion of the gondola 406 may be free to rotate, or may be rotated with respect to the core 409.

In certain embodiments, of a system 10 in accordance with the illustration, the belay take up 290 may retract the lines 304 upward a safe distance above the supporting surface 44. Thereafter, the trolley 110 may be drawn along the rail 112 to induce a swinging motion by the cart 406 or vehicle 406.

For example, when children "pump" a swing, extending their legs forward while leaning backward, they move their center of mass with respect to the point about which the swing is pivoting. Likewise, leaning the torso and head forward, while bending the legs backward at the knees, changes the center of mass forward in the swing urging a backward motion. Thus, leaning backward while extending the legs tends to move the swing forward, while leaning forward with the legs below the knees folded under the seat of the swing puts the center of gravity forward and thereby urges motion rearward. Of course, with the undulating motion of the swing, kinetic energy of motion related to the mass and squared velocity is largely maintained against any friction in the system in order that "pumping" adds to the overall energy changing between potential and kinetic energy. Meanwhile, at the end of each stroke, the person in the swing eventually converts all kinetic energy to potential energy as the swing seat comes to a stop and reverses direction.

In a system 10 in accordance with the illustration, pumping may be done by moving the trolley 110. Coordinating with the extension of the lines 304, or 296 may be done by maintaining the lines at a specific length, while moving the trolley 110. In the illustrated embodiment, where the lines 304 are reeved over sheaves 298 rotating with respect to the frame 14 and with respect to the beam 16, coordination between the belay line 304 and the trolley line 296 may be required in order to define the specific trajectory of the gondola vehicle 406.

Nevertheless, any movement by the trolley 110 away from the cart 406 imparts a vector force along the direction of the lines 304, drawing the cart 406 in the direction of the trolley 110. Thus, programmatically, the combination of movement of the trolley 110 and the lines 304 may induce a swing pattern or "trajectory" having various characteristics. By virtue of having two input variables to alter, namely the position of the trolley 110 and the length of the lines 304, one may configure various trajectories for the cart 406.

For example, one may simply elevate the cart 406 to a safe distance, and then allow the lines 304 to be locked off by the take up unit 290 such that the distance between the trolley 110 and cart 406 varies with the position of the trolley 110. That is, moving the trolley 110 in one direction takes up the lines 304, while moving the trolley 100 in an opposite direction may pay out more length on the lines 304. Meanwhile, any pay out of the belay line 294, and therefore the lines 304, by the belay take up system 290 may counteract any taking up by the trolley 110, or accentuate it. Similarly, various drops may occur by releasing more line 304 by the belay system 290 or movement of the trolley 110 when the belay lines 304 are "locked off."

Figure 8A:
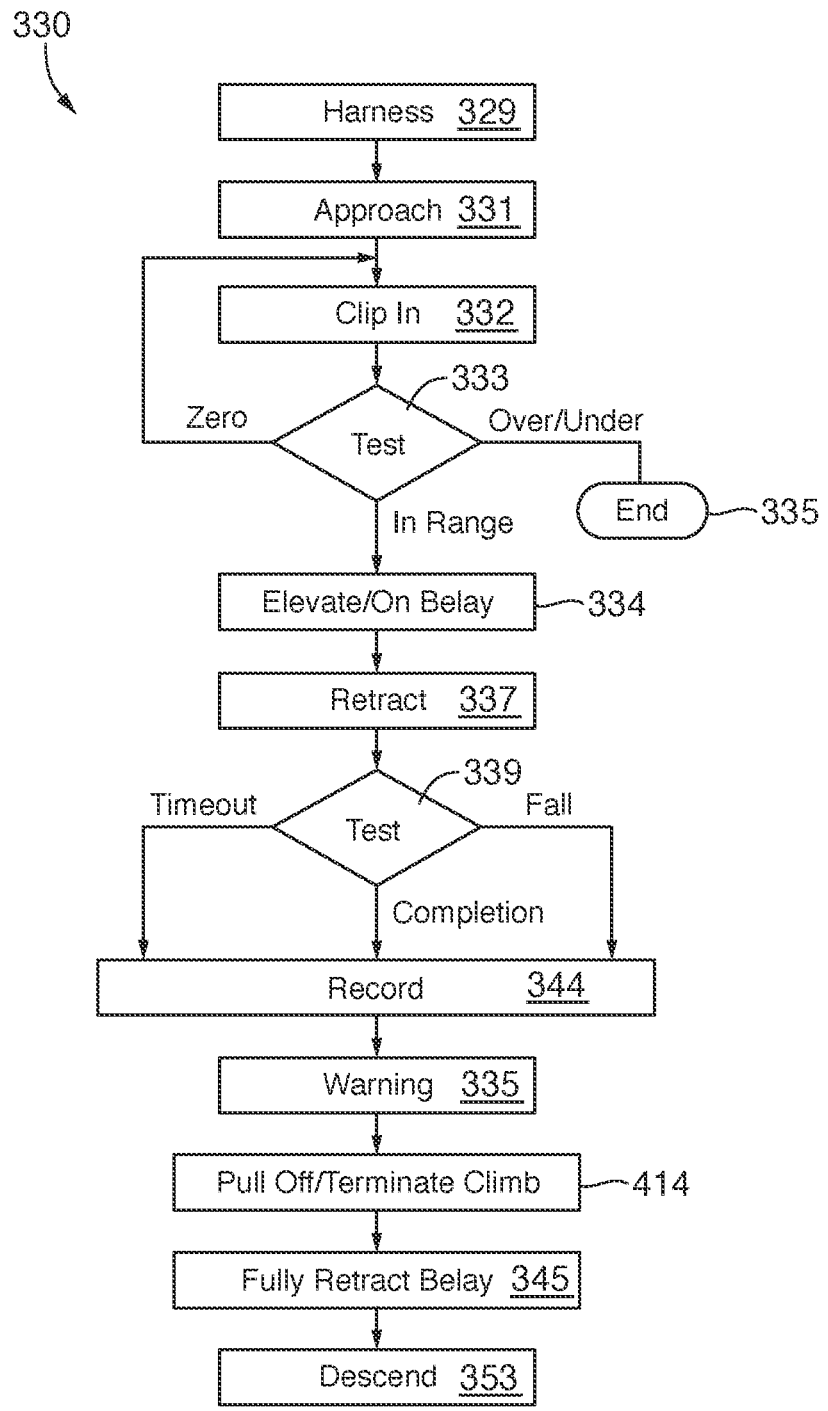
FIG. 8A is a schematic block diagram of a method in accordance with the system of FIGS. 4 and 5.

Referring to FIG. 8A, a process 330 in accordance with the illustrated embodiment of FIG. 4, may begin by harnessing 329 a climber 60 in a full body harness 28. In this embodiment, it is not so important to include a full body harness 28. However, a broader range of experience (expert to novice) may be safely applied to such a system 10 if a full body harness 28 is used. Typically, a user 60 may harness 329 some distance away from the wall 12 and then approach 331 the loading area 24.

A user 60 may clip in 332, or be clipped in 332 by an attendant. This is perhaps the most important safety measure, assuring that the connection is made between a belay line 304, 294, and a harness 28 of a user 60. Nevertheless, a system 10 in accordance with the invention has an additional safety check. A test 333 may be conducted by a controller 140 of any suitable type by instructing the belay take up 294 to take up the belay lines 304 a distance sufficient to load them with the full body weight of the user 60 in the harness 28.

The test 333 shows whether the weight of the user 60 is within range, typically from about 50 to about 300 pounds, depending on the construction of the system 10. Then the process 330 may progress to an "on belay" condition. That is, a user 60 may be put 334 on belay, elevated 334, or both. If a person is outside the suitable range of weights, whether over or under the range, then the belay system 290 may return the lines 304 downward until they are unloaded and no longer supporting the weight of a user 60.

On the other hand, if an effectively zero weight is detected, then the user 60 is not properly clipped in, and the process 330 returns to clip in 332 the user 60. Once on belay 334, the belay lines 304 may elevate 334 a user 60 to a level to reach the holds 30. This may be a safety measure, as well as a protection for less experienced climbers 60. Also, this precludes any interference of a user 60 approaching a wall 12 too closely and snagging a harness 28 on a hold 30 or the like.

For example, some of the holds 30 may actually have projections downward, inward, upward, or sideways, which might snag a harness. Thus, the test 333 may be programmed in the controller 240 to detect an inappropriate resistance or force in the belay lines 304.

Once the user 60 has begun to climb on belay 334, the lines 304 are retracted 337 by the belay take up 290. If the user 60 falls, stalls, or the like, the belay system 290 may be programmed in the controller 140 to automatically descend. However, in the currently contemplated embodiment, no reversal of direction occurs in the belay lines 304 short of a terminal position at the top of the wall 12 or near the top of the wall 12 and the outer sheave 298b.

Retracting 337 occurs by a certain take up force that is immediately locked in by a movement of hydraulic fluid in the take up system 290 such as through a check valve. Retraction 337 is typically monotonic (occurs in one direction). A test 339 may be conducted periodically by the controller 140, and may even occur multiple times per second or even hundreds of times per second.

For example, the test 339 may be programmed to monitor for an increase in weight on the lines 304 indicating a fall, a passage of time past a "time-out" point after which climbing is terminated, or a signal from the actuator 412 indicating that a user 60 has ascended to the maximum available height on the wall 12, completing the climb. In any event, data is recorded 344 and may be transferred back to the controller 140 and thereby back to a master database maintained accessible over the internet and associated with a climber's moniker or username. Thus, speed may be compared between climbers in remote locations acting in similar systems.

Typically, it has been found effective to warn 335 a climber 60 that a climb is to be terminated. A slight tug on the belay lines 304 or a slight drop of a few inches will advise a climber 60 that one should clear from the holds 30, and prepare to terminate 414 the climb. Thereupon, the pull off 414 or termination 414 may typically involve an extension of the positioner 18 moving the outer sheave 298b farther from the wall 12 to preclude any abrasion, striking, catching, snagging, or the like of a user 60 or harness 28 on any of the holds 30 during descent.

This pull off 414 is not conventional at all. Typically, a climber 60 simply terminates and rappels off a wall 12. However, it is valuable to minimize the need for a personal belaying partner, and to minimize the various required skill levels, as well as involvement of attendants. A climber 60 of a very young age or very little experience may climb safely once clipped in and tested by the original test 383. One may ascend to a full retracting 345 of the belay lines 304 to their highest position.

Then the climber 60 is drawn away from the wall 12, and upward toward the outer sheave 298b by outward movement of the carrier 18 or positioner 18, and by retraction 345 of the belay lines 304. These may occur simultaneously, in sequence, or in any order that may be safely programmed into the controller 140.

Once fully retracted 345, the belay lines 304 may be released at a predetermined rate. This pay out from the belay take up system 290, under the control of the controller 140, returns a climber 60 to the floor 44 or supporting surface 44.

Figure 8B:
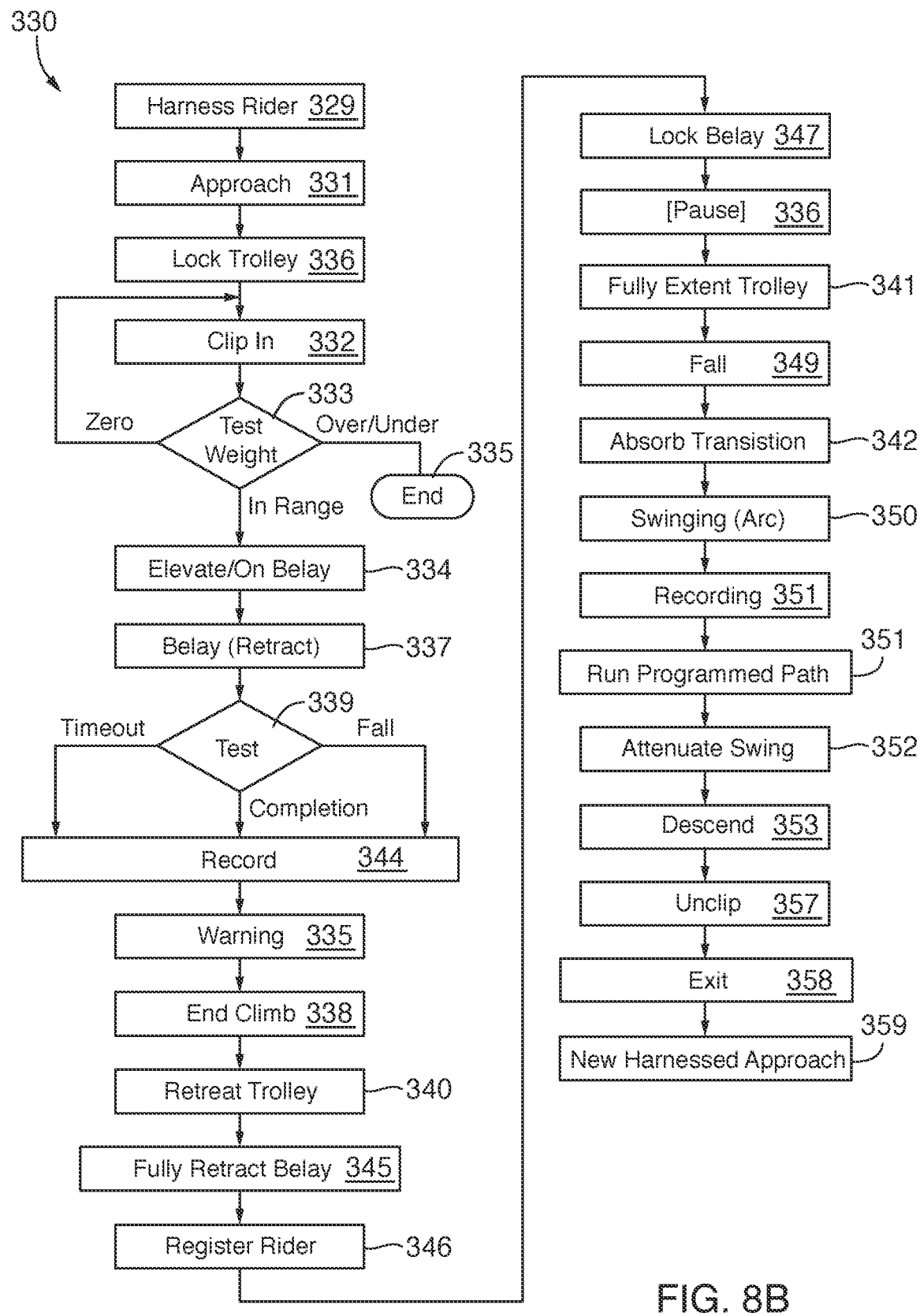
FIG. 8B is a schematic block diagram of one embodiment of a process in accordance with the invention corresponding to the system of FIG. 6.

Referring to FIG. 8B, an alternative embodiment of a process 330 in accordance with the invention may include harnessing 329 a rider 60 who may then approach 331 a climbing wall 12. Typically, locking 336 the trolley 110 into position fixes the trolley 336 and the center of suspension 100 for the belay lines 304 reeved over pulleys 298 or sheaves 298 on the trolley 110. At this point, the belay lines 304 represent a belay to which a climber 60 may clip in 332 a harness 28.

A test 333 may determine whether a weight loading the belay lines 304 is within range. If within range, then the belay take up 290 may elevate 334 the climber 60 on belay. However, if the weight of a user 60 is either under a minimum or over a maximum, typically between about 50 and about 300 pounds, dependent upon the structures of the system 10 and the lines 27, 294, 296, 304, etc. If the test 333 reports to the controller 140 that the weight is out of range, then the process 330 immediately ends 335.

On the other hand, if the test 333 reports a weight of zero, this indicates that the climber 60 is not properly clipped in 332, requiring a return to that step 332. This is perhaps the most important step in that an improperly clipped climber 60 may fall unprotected. For example, if clipping in 332 is not to a proper location on a harness 28, the attachment point may fail dropping the climber 60. An actual zero value indicates that the climber 60 was not clipped in at all. Upon passing the test 333, the belay lines 304 may be retracted by the belay take up 290 to elevate 334 the climber 60 on belay to a location at which holds 30 on the wall 12 may be accessed.

For example, in certain embodiments, the holds 30 are not installed at a distance lower than a standing adult can reach. Thus, there is no chance for snagging a harness 28 on a hold 30, and no or little chance that the test 333 will register an improper weight. If a climber 60 has access to holds 30, that climber 60 may begin climbing and therefore register an improper weight during the test 333.

The belay lines 304 will continue to retract 337 during climbing under the control of the controller 140 sending instructions to the belay take up 290.

Ultimately, during the climb testing 339 may occur repeatedly. For example, testing may simply be done once a sensor 160 of some particular type registers an event. Alternatively, the testing 339 may involve the processor 140 monitoring various sensors to detect each of several possible completion events.

For example, the climber 60 may be slow, weak, afraid, or otherwise fail to advance at a sufficient rate to ascend the wall 12. In this case, a timer, such as a clock instruction in the controller 140 may deem that a maximum time has expired. Likewise, a fall may be detected by the full weight of a climber 60 loading the lines 304. In fact, typically, a fall may involve an increase due to a distance of travel before the lines 304 go taut. Nevertheless, in one currently contemplated embodiment, a fall is not possible, but is instead simply a weighting of the lines 304. The climber 60 may continue by grasping the holds 30 and continuing to ascend.

Completion may be indicated by a button 412 or actuator 412 struck or contacted by a user 60 who has ascended to the maximum height available on the wall 12 using the holds 30. Any of these events from the test 339 matters most in reporting the consequences of the climb, rather than the direction of the process 330. Times, tension profiles, falls, and the like may be recorded 344 along with any other physical parameters, such as forces, stresses, times, and the like characterizing the climb. Upon determining in the test 339 that a climb should end, a warning 335 may be provided an alteration in the positon of the lines 304.

For example, a slight tug upward or a slight descent (a few inches, less than six, typically) of the lines 304 may warn a climber 60 that the climb is ended. Accordingly, the system 10 ends 338 the climb by retreating the trolley 340 away from the wall 12 suitable clearance distance. This is done by fully retracting 345 the belay lines 304 to their maximum safe height near the trolley 110 and its track 112.

At this point in the process 330, the rider 60 or climber 60 is basically registered 346 at a maximum altitude for the belay lines 304, or the harness 28 suspended by the belay lines 304. By registration 346 is meant that the rider 60 and harness 28 come to a predetermined and known position. In general, registration 346 simply means to be gauged, positioned, stopped, aligned, or otherwise positioned with respect to a known position in space. Known to a controller 140, this fixed position may be defined by a line, a surface, or the like on a piece of hardware, or the like.

A rider 60 is registered 346 a particular distance away from the wall 12 in order that the rider 60 cannot fall along a trajectory that will strike any hold 30 on the wall 12, nor the wall itself. Thus, the registration 346 need not be set a great distance from the wall 12, but should preclude contact by the rider 60 with the wall 12, except possibly by feet.

Locking 347, the belay take up 294 basically fixes the amount of the line 304 extending therefrom. No hydraulic response other than a hold 347 constitutes a lock 347 on the belay system 290. A pause 336 is an optional step, but may provide an opportunity for a rider 60 or climber 60 to reach one's feet out to touch the wall 12, and orient the user 60 for a fall. An attendant may remind the rider 60 or a sign may remind a rider 60 to place the feet (rappel-like) against the wall 12 at the highest position, which will typically be above the height of the holds 30.

Next, the process 330 may fully extend 341 (advance 341) the trolley line 296. This moves the trolley from its position close to the wall 12 to a maximum distance away therefrom along the rail 112 and beam 16. The effect of extending 341, advancing 341, or rolling 341 the trolley 110 to its maximum position away from the wall 12 is to facilitate a fall 349 or falling 349 by the rider 60.

In various embodiments, the momentum of the rider 60 has been used to move 341 or extend 341 the trolley 110 away from the wall 12. However, rapid "translation" (liner motion) has been found much more effective in controlling the fall 349. Notably, faster movement aids subsequent integration of the fall 341 and its trajectory into the trajectory of a swinging arc. The capstan system 292 involving a high speed (near the speed of the fall) movement 341 of the trolley 110 away from the wall 12 provides a more nearly arcuate fall 349 by a rider 60.

Moreover, absorbing 342 any acceleration or "g" forces in transitioning from a comparatively straighter trajectory into a purely arcuate trajectory, provides a minimizing of acceleration loads on the body of a user 60 and any shock loading on the lines 304. For example, the controller 140 may control the trolley 110 to move swiftly to nearly its terminal destination at the forward end of the rail 112.

This may move at a slower rate or slower velocity in the last several inches, such as from about 18 inches to about 6 inches. In this way, those last several increments of distance permit slack in the line 304 to be taken up, transitioning into an arcuate trajectory. It may still include paying out some additional portion of the lines 304.

Ultimately, after the transition 342 and the absorbing 342 of loads, swinging 350 occurs in an arc at the length of the lines 304 suspended from the trolley 110. That arc of the swing 350 is defined by the length of the lines 304, but its time depends upon many other factors including weight of a rider 60, cross sectional area, the presence of any wind, any frictional contributions of air or wind resistance against the lines 304, and so forth.

In one embodiment, the swing arc 350 is recorded 351 by sensors 160 appropriately placed. In one currently contemplated embodiment, sensors may be proximity sensors operating on any of several detection mechanisms, including sight, light, magnetics, occlusion, proximity, electromagnetic proximity, or the like. One significance of recording 351, found very effective in controlling the swing 350, its programmed running 351, and ultimately its attenuation 352, is time.

For example, it has been found that the first swing outward 11*a* will be effected by various factors including wind, air drag, weight, and so forth as discussed hereinabove. Accordingly, timing the passage of the lines 304 through a vertical orientation on their passage away from the wall 12, until those same lines 304 pass vertically on their way back toward the wall 12 is very significant. A fraction of that total time may be used for controlling attenuating 352 the swinging 350 of the user 60 on the lines 304.

The run 351 is programmed into the controller 140. It operates to move the trolley 110 (through the trolley controller 140*b*), the belay (by its controller 140*a*), both, or either one thereof. It may be implemented in hardware, software or firmware. It provides interruption of the swinging 350 by additional drops or elevations. For example, taking a fraction or portion of the time of the swinging 350*e* outward (after rider 60 at bottom dead center, BDC) until the return swinging 350*f* inward, back to bottom dead center, yields a time. That time may be multiplied by a fraction of from about 0.3 to about 0.6 to establish a time for attenuation.

For example, in on embodiment, using a proportion of 0.35, the attenuation 352 may be effective by moving the trolley 110 to follow a rider inward 116. Under the control of the controller 140*b*, the trolley 110 follows a rider 60 toward the wall 12 after passing through BDC 450. It follows for a time period of 0.35 times the measured outward BDC-to-inward BDC time. When the trolley 110 moves toward the wall 12, it removes the outwardly vectoring load on the rider by the lines 304. Moreover, such movement of the trolley 110 toward the wall 12 also takes up the amount of each line 304 equal to the distance traveled.

By using time rather than distance, the system 10 automatically accommodates (accommodates, factors in) any weight of rider 60, any weather conditions, any presence or absence of wind, or the like. Thus, the controller 140 adapts the swinging 350 and its attenuation 350 according to the existing conditions on the lines 304 at that exact time. If the attenuation 350 is engaged after a first swing (e.g., on a second cycle outward and inward, along the direction 11*b* of a rider's trajectory), then attenuation timing may be controlled as a fractional proportion thereof.

For example, a rider 60 may swing outward (along axis 11*b*), back toward the wall 12, outward again, and back, toward the wall 12 again. Timing that second cycle from bottom dead center moving outward to bottom dead center moving inward provides a basis characterizing the ride. It may be used to control attenuation 352. Attenuation 352 may begin by simply moving the trolley 110 for a time (span based on a fraction of it. It has been found that 0.35 times the vertical-to-vertical (BDC-to-BDC) (time is a suitable target). Attenuation 352 is suitably done by removal of the outward loading vector by moving the trolley 110 with the rider 60 beginning at inward BDC. The moving trolley 110 takes up the belay lines 304.

The resulting basically attenuates conversion of kinetic energy to potential energy much of the energy and momentum of a user 60. In one embodiment, a user 60 may be left to swing on a remaining, smaller arc, and then dropped by the trolley 110 retreating away from the wall some distance. This may occur on the second cycle, or on another, including the first cycle following attenuation 352 initiation, or otherwise. In other words, a series of swinging 350, falls 349, and attenuation 352 may be programmed into the controller 140. This creates a ride containing a multitude of chimerical patterns.

Ultimately, the trolley 110, in turn, may be locked at a suitable position, after which the belay control 140*a* will control the belay system 290 to descend the rider 60 on the lines 304. Once afoot on the supporting surface 44, the rider 60 may then unclip 357 and exit 358 making way for an approach 359 by a newly harnessed rider 60.

Figure 8C:
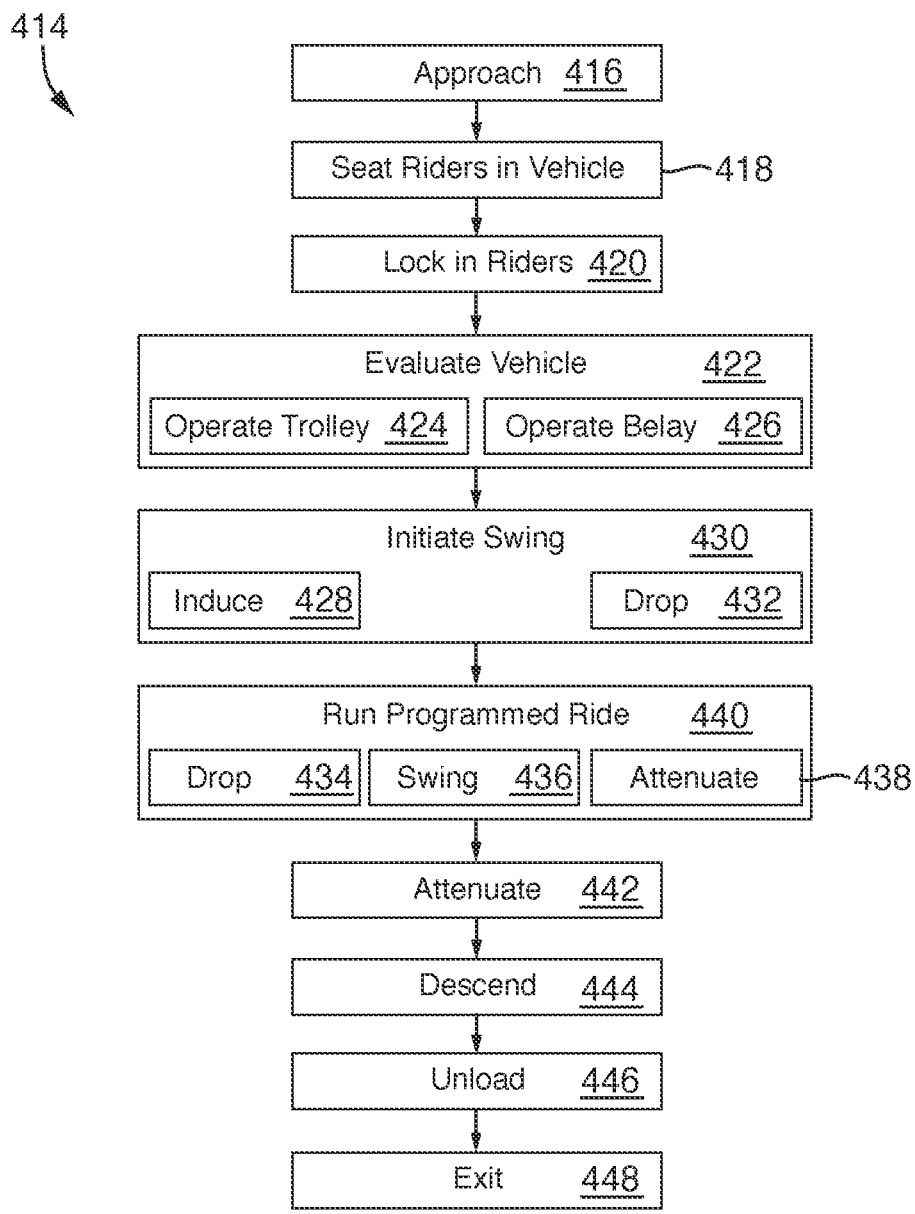
FIG. 8C is schematic block diagram of a method in accordance with the invention, corresponding to operation of the system of FIG. 7.

Referring to FIG. 8C, an alternative embodiment of a process 330, herein implemented as a specific process 414, corresponds to the embodiment illustrated in FIG. 7. Riders 60 may approach 416 a vehicle 406 (gondola 406) secured to belay lines 304. The riders 60 may be seated 418 (e.g., facing outward) in the vehicle 406 and locked in 420. Typically, locking in 420 is effected by providing barriers that confine a rider 60 to a particular seat 408 and against escaping intentionally or accidentally therefrom.

A typical lock 407 or guard 407 may actually involve a hinged yoke coming down over the head in front of the torso, and typically terminating in some type of a bar across the lap restraining (e.g., vertically and horizontally) the legs within the seat 408. To this end, the seat 408 may be shaped to provide part of the restraint 407 or locking device 407 restraining the riders 60 in their seats 408 in the vehicle 406 or cart 406.

In the illustrated embodiment, the riders 60 may approach the cart 406 positioned anywhere along the length of the beam 16. Typically, one may expect a ride to begin at one end of the beam 16. In fact, one embodiment this system 10 may be operated exactly as in FIGS. 6 and 8B, minus the climb. Once seated 418 and locked 420 into position, the riders 60 may rise with elevating 422 the gondola 406. Elevating 422 may involve fixing the belay 290 and operating 424 the trolley 110 alone. Alternatively, elevating 422 may be a result of fixing the trolley 110 and operating 426 the belay system 290 moving end to end alone.

Thus, the controller 140 may control the belay take up 290, the trolley take up 292, either drive 290, 292 alone, or both 290, 292 in some programmed combination. That programmed functionality is designed to obtain a specific trajectory (rider path) on which the cart 406 or vehicle 406 will be elevated 422, and ultimately operate to drop, swing, lift, and attenuate in any combination during the ride 414 or process 414.

Once elevated 422, riders 60 may experience initiation 430 of a swing. This initiation 430 may be by inducement 428 or pumping 428 (changing relative positions of pivot 100 and cart 406 to achieve a swinging motion. Alternatively, much as in certain previously discussed embodiments, the swinging may begin with a drop 432 from the region near one end of the beam 16 by virtue of the trolley 110 quickly passing to the opposite end of the beam 16, much as in the embodiment of FIG. 6.

However, inducing 428 may involve lifting the vehicle 406 clear by any combination of retracting the belay lines 304 and moving sheave 298 (see 298b in FIGS. 4, 5, and 7) and its the trolley 110 along the rail 112.

For example, one may coordinate by programming the controller 140 to operate both the belay take up 290 and the trolley drive 292 in order to obtain virtually any path between the sporting surface 44 and the maximum altitude permitted the cart 406 under the track 112 and beam 16. For example, one may retract the belay line 290 while moving the trolley 110 in order to maintain the cart 406 or vehicle 406 altitude constant, terminating with a stop of the trolley 110, resulting in swinging outwardly away from that terminating end of the beam 16 and track 112. This same motion may be repeated in an opposite direction, following the same beam 16 to its opposite end, but this time again manipulating the belay take up 290 to maintain a particular height.

In yet another embodiment of inducing 428 a swing, the belay system 290 may be locked with the vehicle 406 at a sufficiently high altitude that the entire length of the beam 16 or rail 112 may be traversed by the trolley 110 without the vehicle reaching the supporting surface 44. Thus, the vehicle 406 may be in a position to swing, and yet experience a drop leading into that swing. Again, any number of vectored inducements 428 or drops 432 may be accomplished by control of the trolley drive 292, belay take up 290, or both. Most straightforward is to lift with the belay 290, lock it, and drop (paying out the lines 294, 305) by moving the trolley 110.

Ultimately, running 440 a program or running 440 a programmed ride 414 may involve a calculated, programmed, and predetermined series of drops 434, swings 436, lifts 422 and attenuations 438. Attenuations 438 may be done in order to increase the thrill of a drop 434, or to prepare for a "slow" descent in a controlled fashion at the end of the ride 414. Thus, the various modes described with respect to FIG. 6 and FIG. 8B may be implemented in the configuration of FIG. 7 in the ride 414.

There is literally no end to the number of paths 410 or trajectories 410 that may be achieved by running 440 a programmed ride 414. In certain embodiments, the seats 408 may rotate about a core 409 in order to add an additional dimension of thrill and dis-orientation to riders 60.

In certain contemplated embodiments, the attenuation 442 of the ride may be done precisely as in FIG. 8B (less the climb) with reference to the embodiment of FIG. 6. It has been found that measuring the time between a vertical orientation of the belay lines 304 and a swinging arc in one direction from BDC 450 and another direction returning to BDC 450 provides a time that characterizes the entire dynamics of a rider 60. That time may be multiplied by a factor from about 0.35 to 0.5. Generally any number up to 0.5 may be doubled to take up the belay lines 304 to approximate a fraction of the attenuated time moving in either direction without return. A combination of the trolley 110 (moving to remove the reverse vector tending to continue the oscillation of the cart 406), while at the same time elevating the cart 406 take away its ability to return stores potential energy of the rider 60.

For example, coming to nearly a stop, with the trolley 110 exactly overhead of the cart 406, and the belay lines 304 taken up to remove the depth of the swinging arc, will bring the cart 406 to a virtual or near stop (using the 0.35 factor) and to a stop (using the 0.5 factor) within a single cycle. Meanwhile, this can be applied in any residual swinging motion to bring the cart 406 to substantially a total stop. Once sufficiently slowed or stopped, the cart 406 may descend 444 by descending 444 the belay lines 304 by the belay take up system 290. At this point, resting on the supporting surface 44, the cart 406 may be unlocked and otherwise unloaded 446, permitting the riders 60 to exit 448.

Figure 9:
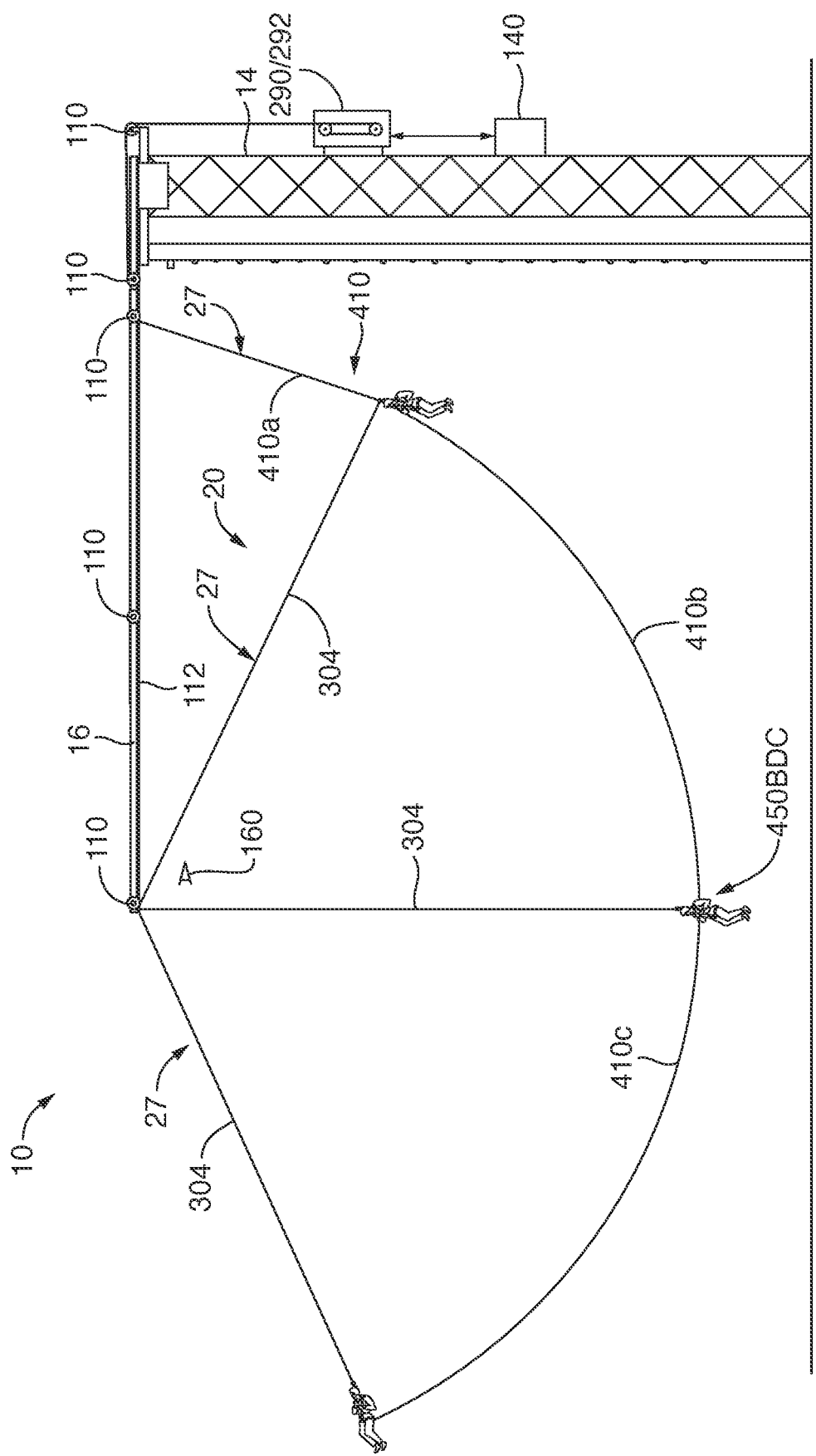
FIG. 9 is a side, elevation view of one embodiment of system in accordance with the invention, illustrating a trajectory of a rider in a method in accordance with the invention.

Referring to FIG. 9, while continuing to refer generally to FIGS. 1 through 12, in some embodiments of a system 10 in accordance with the invention, a trajectory 410 of a rider 60 may begin at the surface 44 with or without the presence of a wall 12. As described hereinabove, by whatever mechanism, a rider 60 arrives at a topmost position proximate but spaced away from any obstruction and the frame 14. One may consider the drop-and-swing portion of the trajectory 410 to begin there.

For example, one may climb, or may be lifted directly from the level of the surface 44. One may have partially climbed and then fallen or stalled, and so forth. Ultimately, the path 410 of a rider 60 will typically move to a position spaced from any wall 12 and frame 14 sufficiently to preclude collisions, snags, and so forth. Meanwhile, the trolley 110 (supporting the belay lines 305) moves from a position proximate a first end of the track 112 (near the frame 14 or wall 12, if present there). It then quickly moves under the influence of the trolley drive 292 toward the far end of the rail 112, and beam 16 in support.

Typically, the segment 410a of the trajectory 410 may vary depending upon the speed at which the trolley 110 retreats along the track 112. For example, if the weight of the rider 60 is relied upon, then the rider's 60 momentum exchange to the trolley 110 is necessarily limited by the descent of the rider 60 along a trajectory segment 410a. On the other hand, a capstan 400, as described hereinabove, increases the speed at which the trolley 110 retreats away toward the far (distal) end of the rail 112. It may be engineered to be faster than the descent of the rider 60 suspended by the belay lines 304. "Faster" is usually better, but only enough speed is needed to limit acceleration "g's" of transition from falling to swinging. That is about two g's and preferably below one and a half g's.

In this situation, the trajectory 410a or the segment 410a of the trajectory 410 may actually be a pure arc. Typically, however, is not necessary to maintain such a speed and the segment 410a may approach something approximating a straight line. However, at the transition from the segment 410a to the arc segment 410b, a straight line trajectory 410a may intercept an arcuate trajectory segment 410b. This creates an abrupt change of direction. To minimize the "g" forces occasioned by that change in direction, the controller 140b of the trolley drive 292 may have a programmed slowing near the distal end of the rail 112. This assures that the vectored force exerted by the lines 304 on a rider 60 begin to draw the rider 60 into an arc, while still providing a desired, engineered, amount of pay out of the lines 304. Thus, one may engineer a trajectory 410 that transitions as smoothly as desired between the segment 410a and the segment 410b.

Once entering the trajectory 410b, the path 410 or trajectory 410 becomes an arc of constant radius diameter. As discussed hereinbelow, this may be modified programmatically. In the presence of a fixed length of the lines 304 below the trolley 110, the trajectory segment 410b is an incoming arc toward bottom dead center 450 (BDC 450). The BDC 450 is a location at which the rider 60 is directly below the trolley 110, and any center of suspension 100 (center of pivot 100) thereat. Accordingly, the trajectory segment 410c represents an upswing and outswing as the rider 60 progresses from the BDC 450 and toward the ultimate end of the trajectory 410c.

Thereafter, that segment 410c also represents a return path 410c toward BDC 450 as the potential energy of the rider 60 is again converted (by descent and the force vector of the lines 304) to a maximum kinetic energy at the point 450, the BDC 450. Meanwhile, depending upon wind, air drag, frictional resistances within the system 10, and the like, the segment 410b is likewise traversed back in a return direction opposite the incoming direction, toward the proximal end of the beam 16 and track 112.

In certain embodiments of an apparatus 10 or system 10 in accordance with the invention illustrated in FIG. 9, a rider 60 may be permitted to traverse the segment 410b and 410c outgoing as well as traversing the segments 410c and 410b incoming twice or more. Eventually, the initial thrill, occasioned by the initial speed, surprise, and so forth will decrease substantially in subsequent oscillations along the segments 410b, 410c. Accordingly, the ride may be attenuated at a second cycle or another such time.

Figure 10:
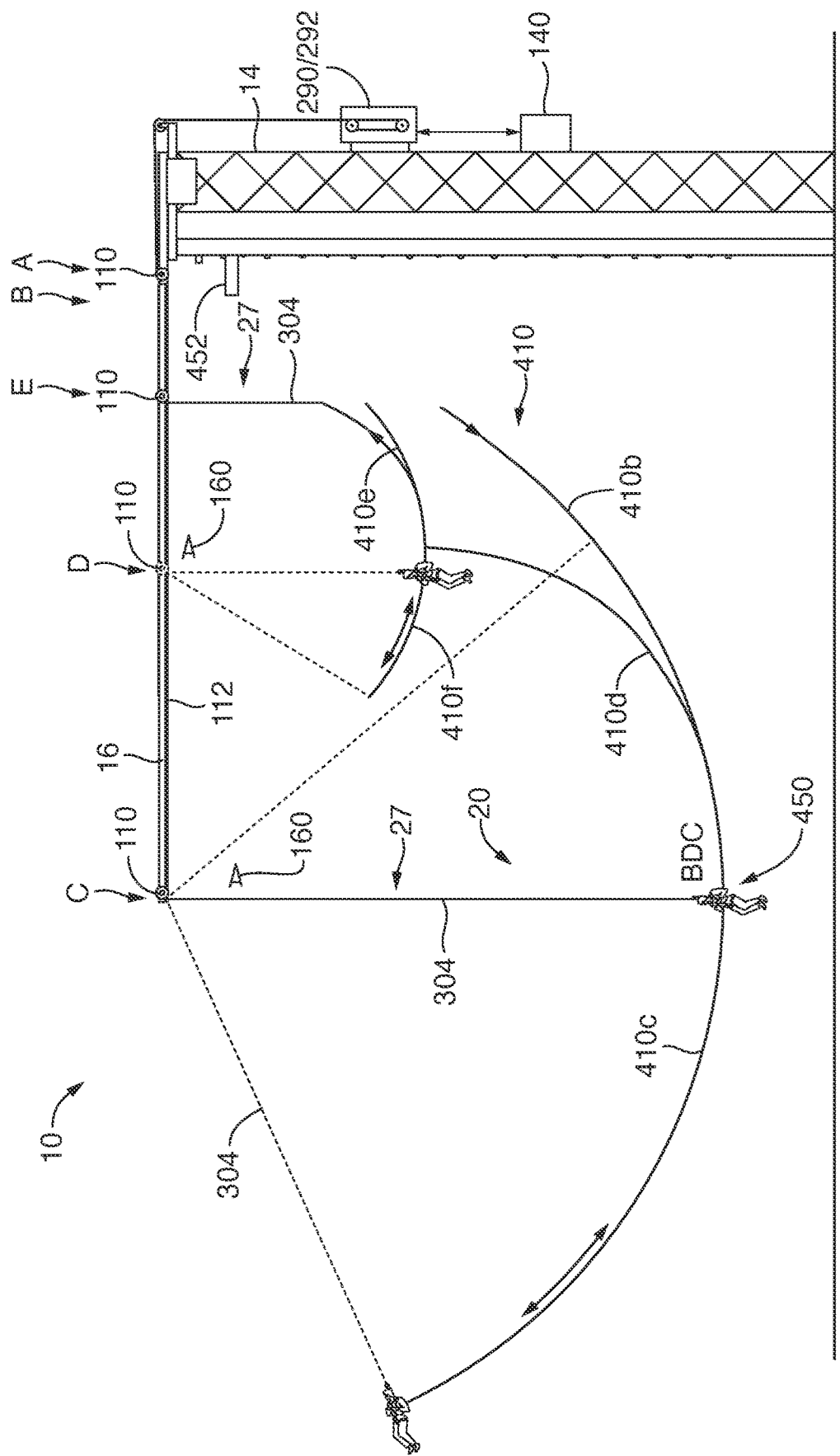
FIG. 10 is a side, elevation view of an alternative operational method including an attenuation procedure in a system and method in accordance with the invention.

Referring to FIG. 10, the trajectory 410 is illustrated in its various segments that may take place following a first, but typically a second cycling through the segments 410b, 410c outward and then inward (along axis 11b, but descending and rising a long axis 11a). For example, following a second return inward (toward the proximal end of the beam 16 and rail 112) the controller 140 may instruct the trolley drive 292 to follow inward the rider 60 on a trajectory 410d of the rider 60. The trajectory 410d rises above segment 410b by virtue of the trolley 110 moving inward 11b toward the tower 14, and lifting the rider 60 by taking up the lines 304.

For example, every increment of distance that the trolley 110 moves toward or with the rider 60 removes reverse vectored force away from the moving rider 60 to vertically up. This relieves the tendency of the lines 304 to draw the rider 60 back into the oscillatory path 410b, 410c. Therefore, the trolley 110 may begin at a location A illustrated along the beam 16, but will typically initiate the fall and swing at a location B spaced from the end of the track 112, such as a tower 14, wall 12, or the like, if present. Accordingly, the trolley 110 moves "slowly" from A to B, but rapidly from position B to position C at the distal end of the beam 16 and rail 112.

By moving inward 11b toward the positon D, the trolley 110 attenuates energy and momentum, takes away momentum of that rider 60. The removed force vector and the altitude gain would otherwise have represent a potential energy capable of driving a return swing outward. Instead, upon arriving at position D, much of the momentum has been removed from the rider 60, and much of the altitude has been locked in. Thus, the kinetic energy has been converted to potential energy, but the potential energy itself has been locked against conversion back to kinetic.

Depending on the relative fraction or ratio of time that the trolley 110 moves between the position C and position D, some residual amount of momentum may exist and contribute to a trajectory 410e swinging somewhat toward the position A, followed by a return along a trajectory 410f away from the tower 14. This oscillation along the trajectories 410e inward and outward followed by the trajectory 410f inward and outward may be permitted to continue for some number of cycles. However, it may also be attenuated within a second cycle by moving the trolley 110 from position D to position E during an inward traverse along the trajectory 410e.

For example, the trajectory 410g may be followed to essentially terminate any oscillation of the rider 60 and harness 28 along the trajectory 410. In one currently contemplated embodiment, the time of travel of the trolley 110 between locations C and D and between locations D and E is calculated by taking a fraction of the swing time on the outward swing, such as outward and inward cycle on the trajectory 410c, from bottom dead center 450 and return thereto, or outward and inward on trajectory 410f. A fraction of that time may be used. For example, 0.35 has been found a suitable fraction of cycle time for that time BDC-out-in-BDC. The trolley 110 may move inward past BDC 450 toward the tower 14 for a time of 0.35× cycle time on the trajectory 410d. This is about one third the total time out and back on the trajectory 410c, or about two thirds of what would have been the swing inward on trajectory 410c. Similarly, to bring the rider 60 to substantially a complete halt for all practical purposes, the trajectory 410g may be governed by a time of traverse between positions D and E by the trolley 110 corresponding to about 0.5 times the residual cycle times, outswing and inswing along the trajectory 410f.

Once the trolley 110 so arrives at position E, the motion of the rider 60 in any type of oscillation is insignificant. The lines 304 may then be extended by the belay drive 290 controlled by the controller 140a. Of course, the controller 140a, 140b, refer primarily to the objects of control, since both controllers 140a, 140b may be combined into a single computer system 140 or controller 140.

To implement the attenuations 442 provided in FIG. 10, sensors 160 may be provided in a suitable location to detect the vertical orientation for the lines 304. To do so, the sensor 160 may be secured to, or otherwise travel with, the trolley 110. In alternative embodiments, the sensors 160 may be distributed along the beam 16. However, a simple sensor system with a battery control or battery control and automatic recharge in some resting position of the trolley 110 may provide for long life, and, eventually, unceasing operation of a sensor 160.

For example, a sensor 160 may detect the BDC 450 condition or position of a rider 60 by detecting the vertical position and direction of the lines 304, during the trajectory segments 410b, 410c. Similarly, the sensor 160 may detect the timing along the trajectory 410f. Typically, a factor of about 0.5 will effectively run the trolley 110 between positions D and E for about the total time elapsed for the incoming or outgoing direction on the trajectory 410f. Thus, no substantial momentum need remain following an inward trajectory 410g.

The lines 294, 304 may be extended by the belay take up system 290 at an appropriate speed for permitting a rider 60 to arrive at the supporting surface 44, gain footing, and stand independently from the lines 304. At that point, a rider 60 may unclip 357 and exit 358. The trajectories 410 illustrated in FIGS. 9 and 10 may be implemented in the system 10 of FIG. 6 or that of FIG. 7.

Figure 11:
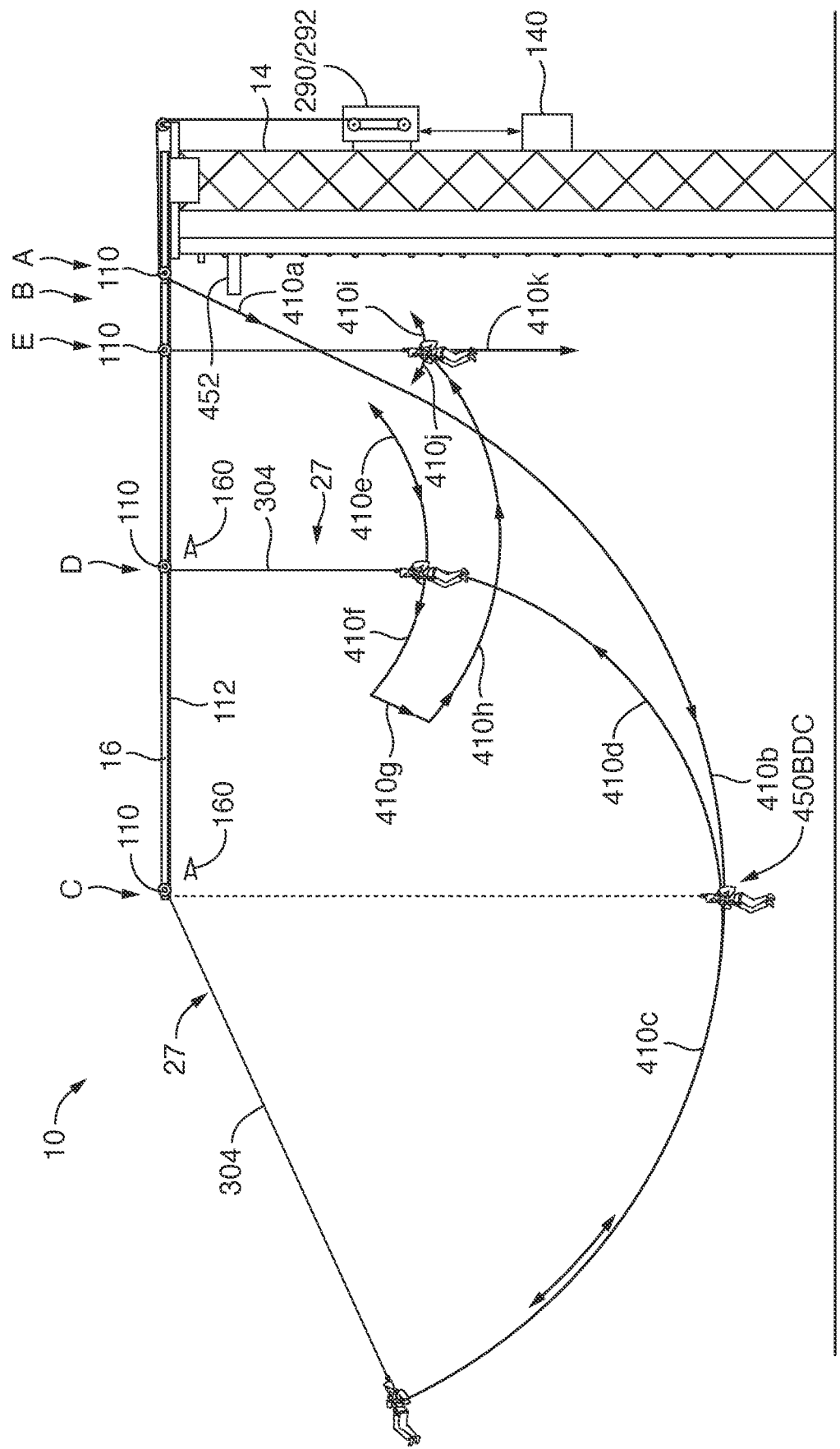
FIG. 11 is a side, elevation view of a programmed trajectory involving at least one pendulum fall, swing, additional drop, attenuation, and descent according to certain embodiments of a method and apparatus in accordance with the invention.

Referring to FIG. 11, a programmed ride 440 may be implemented in a system 10 by initially moving a trolley 110 from a position A along a rail 112 to a position B spaced some distance from the end of the track 112, or any frame 14 or associated wall 12 that may exist. Thus, any collision therewith may be avoided, as well as snags and the like. A trajectory segment 410a occurs as the trolley 110 retreats along the rail 112 from a position B to a position C at the distal end of the track 112 or rail 112.

Eventually, as described hereinabove, a transition will occur between a segment 410a and a segment 410b. This transition may be smoothed as discussed hereinabove. At the BDC position 450 the arc is smooth and complete at a fixed, specific length corresponding to the extension of the lines 304 below the trolley 110. Thus, the trajectory segment 410c operates as described above, as does the path along the trajectory 410d. Again, the trajectory 410d may occur after a single outward and inward passage along the trajectory segment 410c, or on a second traverse thereof by a rider 60.

However, depending on the fraction of energy and momentum remaining after movement of the trolley 110 from a position C to a position D, sufficient momentum and energy may exist in the trajectory 410e to provide a reduced but significant arc of swing along the segment 410f.

In one currently implemented embodiment, it has been found that the trajectory 410f may be traversed outward and inward one or more times following which a drop trajectory 410g may be implemented. Thus, the trajectory 410g permits the rider 60 to fall as the trolley 110 retreats from position D toward position C temporarily. A payout of lines 304 by the belay take-up 290 may also cause drop. Following a drop trajectory 410g of the rider 60, the trolley may move back toward position D, or may extend the lines 304 to maintain an arc along the trajectory segment 410h.

Thus, a ride 440 may be engineered to have multiple arcs and drops along a trajectory 410 lasting for a predetermined and pre-programmed period of time. In the illustrated embodiment, following the drop 410g, if only the trolley 110 moves back to position D, then the BDC 450 will becomes a joinder of the trajectory segments 410e, 410f. Thus, a trajectory segment directly proceeding from the bottom terminus of the trajectory segment 410g may move directly up to the intersection between the trajectory segments 410e, 410f.

In an alternative programmatic trajectory 410, the drop 410g may add kinetic energy and momentum to a rider 60 augmented by extending lines 304. A new trajectory segment 410h is introduced, by a longer extension of the lines 304, while the center of pivot 100 or center of suspension 100 remains on the trolley 110 at a fixed position D. Thus, the trajectory segment 410h may represent an arcuate path in which a rider 60 may oscillate inward and outward (11b) along the trajectory 410h.

This may continue until movement of the trolley 110 from a position D to a position E attenuates the oscillation of the rider 60, at least to comparatively smaller trajectory segments 410i, 410j. At this point D, the belay take-up system 290 may pay out the belay lines 304 along the trajectory 410k until the rider 60 has again gained footing to support standing on the supporting surface 44.

It should be understood that the trajectory segment 410k may initiate at the joinder between the segments 410i, 410j. It may initiate at the inward terminus of the segment 410e, depending upon whether the belay take up 290 is engaged to pay out additional length of the line 304, or if the entire trajectory 410 is controlled by movement of the trolley 110.

Figure 12:
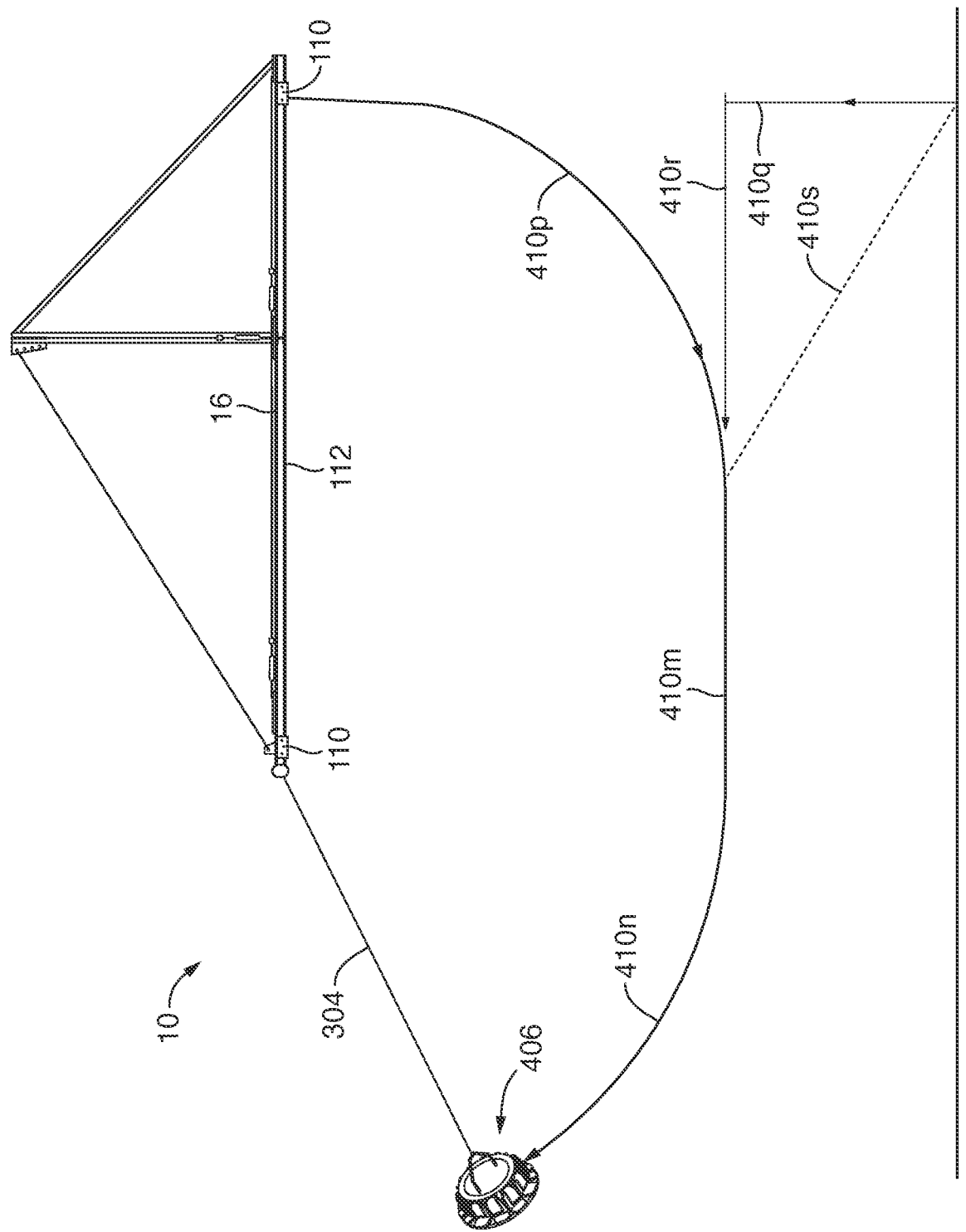
FIG. 12 is a side, elevation view of one embodiment of a trajectory of a gondola or cart as a vehicle carrying riders, or a rider in a system and method in accordance with the embodiment of FIG. 7 hereinabove.

Referring to FIG. 12, a system 10 in accordance with the invention may be implemented in a structure corresponding to FIG. 7. On the one hand, the programmed ride 440 illustrated in FIG. 11 may be implemented on a system 10 of FIG. 6, or the system 10 of FIG. 7. However, additional trajectories 410 may also be available to the system 10 of FIG. 11.

For example, in the illustrated embodiment, a segment 410q or 410s may be traversed by a rider 60 being elevated 334, 422. A rider 60, or multiple riders 60 on a cart 406 may be elevated along the trajectory segments 410s or 410q. In the case of segment 410q of the trajectory 410, the trajectory segment 410r may simply be a prelude to entry into the trajectory 410m.

Also, for example, inducing 428 a swing may be initiated by a fall as described in detail hereinabove, or may simply be induced 428 by "pumping" 428. In one example, the trolley 110 may be controlled, as well as the belay lines 304, in order to maintain a level trajectory segment 410m. At the end thereof, a segment 410n will become an arc centered on the sheave over which the lines 304 reeve through the trolley 110 directly thereabove.

Similarly, that trajectory may be increased in amplitude and therefore altitude by pumping 428 the system 10 pumping is possible by traversing in reverse (e.g., back and forth) along the segment 410m to add energy and momentum which then results in a rising, arcuate trajectory 410p. Ultimately, this pumping 428 may result in a larger arc in which the trajectory segments 410p and 410n. They may even extend their radius by paying out the lines 304 by the take-up 290. They may thus eventually join, having eliminated the distance or length of the flat segment 410m. In such a condition, a BDC 450 exists at the joinder of the segments 410p, 410n, which constitute a complete arc at a single radius established by the belay lines 304.

Again, all of the attenuation processes 438, 442, 334 hereinabove may be implemented by suitable programming of the controller 140 directing the operation of the belay take up 290 and the trolley drive 292.

Typically, a frame 14 or tower 14 may extend from about 60 to about 600 feet. Smaller towers 14 have also been built and operated. However, the ultimate height 104 of a tower 14 along with the length of a beam 16 and its rail 112 supported thereby control how expansive or at what radius 102 the trajectory 410 may operate. Thus, being elevated away from the supporting surface 44 sufficiently provides more safety, being able to be spaced away from the tower 14 or frame 14 provides more safety, all controlled by a program run 440 in a controller 140 in a system 10 in accordance with the invention.

For example, it is contemplated that towers 14 of 300 feet may be typical, while shorter towers 14 may be suitable where space constraints already exist due to other theme park rides, other real estate obstructions, or the like. Meanwhile, in theme parks where space is already congested, it is contemplated that towers 14 of 600 feet in height may be able to elevate 334, 422 riders 60 and vehicles 406 to such a height above existing structures, that a system 10 operates far above other structures. This also adds to the thrill of the ride 440 as well as possible radii of the arcs 410b, 410c in the trajectory 410 of such a programmed ride 440.

Example

Here's how a system 10 works in one current embodiment in accordance with the invention. Once the cycle is initiated, harnessed patrons have 20 seconds to climb as high up the wall 12 as they can before time runs out, at which point the ZipWhipper™ 10 takes over and pulls them to the top of the wall. The height climbed and time of each climber is recorded by the controller 140, allowing participants 60 to compete against each other.

At the top of the climbing wall 12, participants 60 are given a short time (a second to a few seconds) to look around, place feet in a rappelling stance, and contemplate their height before the ZipWhipper™ drops them backwards into a breathtaking pendulum free fall trajectory 410, swinging them outward 11b away from the wall 12. This part simulates a "lead fall" when rock climbing.

What happens next is a function of the attraction's unique technology. The ZipWhipper's swing dampening system measures each climber's swing time, and automatically adjusts to decrease each individual swing while continuously maintaining their position away from the wall.

Just as the swings are shortening and the participant begins to relax, one ZipWhipper™ program drops them 10 feet in mid trajectory 410 for one last jolt of excitement. This move serves two functions. It simulates the feeling of a drop that happens when a climber 60 misses a clip during rock climbing, and surely squeaks one last scream out even the bravest participants. It also may be used to dampen and stop the swing so the participant 60 can be lowered gently to the ground 44. A mere 75 seconds may complete the entire trajectory 410 after the experience began.

At 50 feet tall, one prototype of the ZipWhipper™ tower 14 is much taller than a typical, single-pitch, climbing wall. This adds to the excitement of the experience, combined with the trolley rail 112 that extends horizontally from the top, also makes it a visually appealing feature.

Each tower 14 is designed to accommodate multiple ZipWhippers™ 10, arranged in a spoke fashion around the central tower. One to 12 ZipWhippers™ can typically be installed on one central tower. The climbing wall 12 and tower 14 can also be designed to be totally ground supported at any height between 30 and 200 feet.

The ZipWhipper™ 10 is suitable for all ages and abilities. The minimum weight requirement in the prototype is 50 lbs., and the maximum is set at 275 lbs. This makes an ideal attraction for any facility, especially those that are family friendly. Plus, the system can easily lift any participant to the top who doesn't want to climb, or isn't able to. The ride is available to anyone who would still like to enjoy the rest of the experience.

In addition, unique harnesses available on the ZipWhipper™ 10, mean riders 60 with physical disabilities are able to participate, further broadening the inclusivity of the attraction.

With all the combined elements of the experience including timed and measured climbing, a second at-height drop, and swings, all in 75 seconds. Participants desiring another try as soon as they've reached the ground are already fitted in their harnessing equipment and connected to the ZipWhipper™, a second attempt is as easy as pushing a button activating the controller 140 to start the cycle again.

Figure 13:
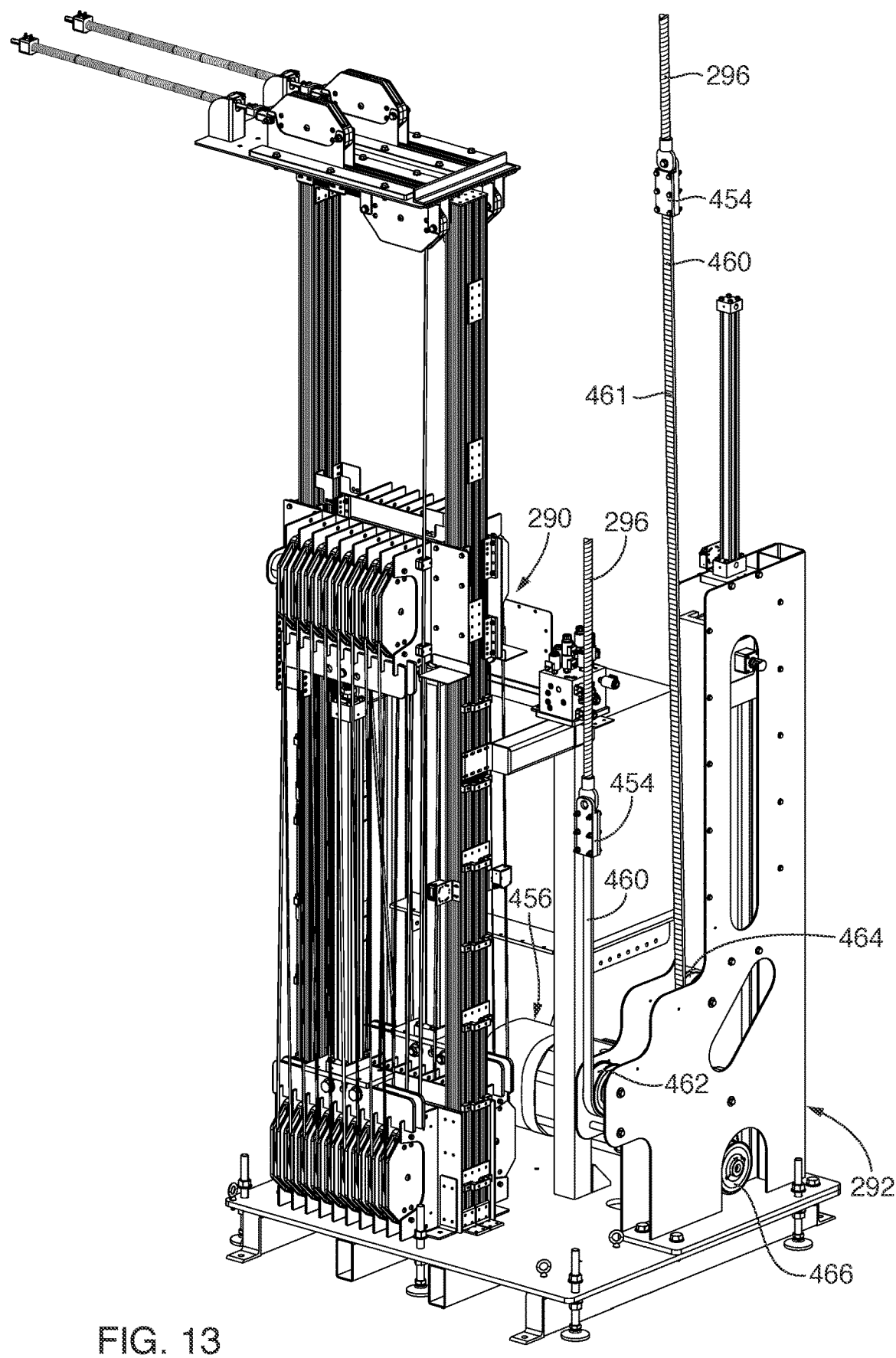
FIG. 13 is a frontal, end, perspective view of one embodiment of a positive drive system for a trolley mounted on a base shared with a distance-multiplier, hydraulic system with banks of sheaves for obtaining a much faster take up in the belay lines than the speed of the powerful hydraulic cylinder pushing the banks apart and pulling them together.
Figure 14:
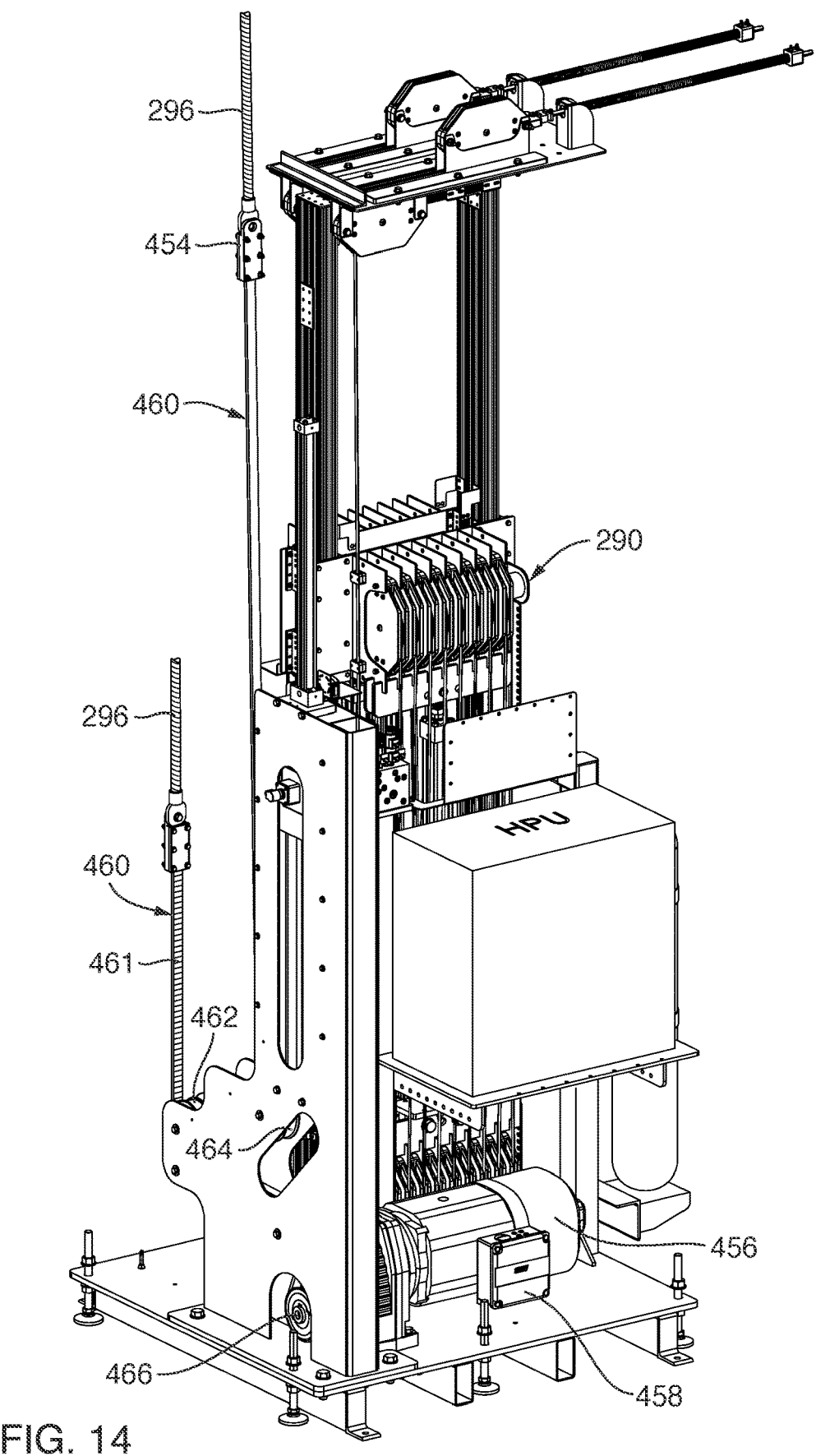
FIG. 14 is a rear, and outside end, perspective view of the positive drive system operating as a motive mechanism for driving a trolley both outward and inward along its supporting rail, and providing a positive control and movement not susceptible to the slippage and wear that a capstan may introduce.

Referring to FIGS. 13 and 14, a system 10 in accordance with the invention may rely on a belay take-up system 290 as described hereinabove. Similarly, a trolley take-up system 292 may be operated from a shared base, frame, or the like. In one currently contemplated embodiment, the trolley take-up system 292 includes two take-up lines 294, one for each direction, "out" and "in." In certain embodiments, a trolley 110 may require an affirmative force drawing it outward on the rail 112 away from the supporting frame 14 or tower 14.

Moreover, it has been found that a capstan 400 as described hereinabove may still suffer from a certain amount of slipping between the sheaves 396, 398 and the lines 294, 296. This small amount of slippage has not been particularly problematic heretofore. However, when striving for absolute repeatability, it has been found useful to increase the precision, repeatability and the "positivity" of the trolley take-up system 292. To that end, in one embodiment, a bracket 454 may be secured to the lines 296, or one bracket 454 to each line 296, driving the trolley 110 along its rail 112 or track 112.

As a motive mechanism 456, a motor 456 may be operated under the control of a controller 458. Of course, overall controllers 140, such as the controllers 140a, 140b described hereinabove may actually send programmed signals to the actual controller 458 on the motor 456. In the illustrated embodiment, the belt 460, also known as a positive drive belt 460, implemented herein as a toothed belt 460, is driven by virtue of teeth 461 on the belt 460.

Referring to FIGS. 13 and 14, one will note that a guide pulley 462 is also toothed, and positions horizontally one extremum or end of the drive belt 460 where it connects by a bracket 454 to a trolley 110 take-up line 296. Meanwhile, other guide pulleys 464 may operate as idlers 464 on fixed or movable axles, such as for maintaining a specific tension load in the drive belt 460 and the connected take-up lines 296. Ultimately, a positive drive pulley 466 will connect, either directly or through a system of gears, other "reduction drive," or the like to the motor 456 driving the belt 460.

To some extent, everything touching the belt 460 except the positive drive pulley 466 may operate as a guide 462, 464 or idler 462, 464. However, depending upon which face of the belt 460 is in contact with a guide pulley 462, wherein teeth would be preferred or even possibly required, in a guide pulley 462. Otherwise, one may simply operate as a smooth pulley 464 contacting a non-toothed face of the belt 460. Each pulley 462, 464 will be engineered into the creation of a threaded path of the drive belt 460 around its guides 462, 464 and its drive pulley 466.

Together, everything from the motor 456 and its controller 458, including the belt 460 and pulleys 462, 464, 466 may be thought of as a positive drive system 470. In fact, in some references, one may refer to the entirety from the controller 459 and motor 456 through the trolley take-up lines 296 to be part of a positive drive system 470 driving the trolley 110. By virtue of the teeth 461 on the drive belt 460, the system 10 may enforce a measurable predictability and repeatability in the positioning of the trolley 110 along its track 112. By using a suitable control system 458 operated by a trolley control 140b (discussed hereinabove) one may track, control, and verify that the belt 460 is exactly where it is controlled to be, as likewise the trolley 110. A plurality of sensors 160a as discussed hereinabove may detect positions of the belay lines 294, 304 as well as the trolley 110.

Typically, the system 10 is largely controlled by feeding back to the controllers 140a, 140b hereinabove, the timing at which a belay line 294, 304 passes bottom dead center 450 (BDC 450), initiates, and terminates. However, it has been found that a very simplified algorithm based on clocking and timing a belay line 294, 304 passing bottom dead center in each direction as described hereinabove. This provides for a rapid, precise, repeatable control that automatically accommodates prevailing winds, weight, size profile of a rider, and so forth. Thus, many biases imparted by wind, aerodynamic cross-section, mass, and the like have been found to be accommodated by the processes discussed hereinabove with respect to sensing a belay line 294 passing by its bottom dead center position 450, whether passing outward (e.g., 320d) away from the tower 14 or retreating back (e.g., 320f) toward the tower 14.

Figure 15:
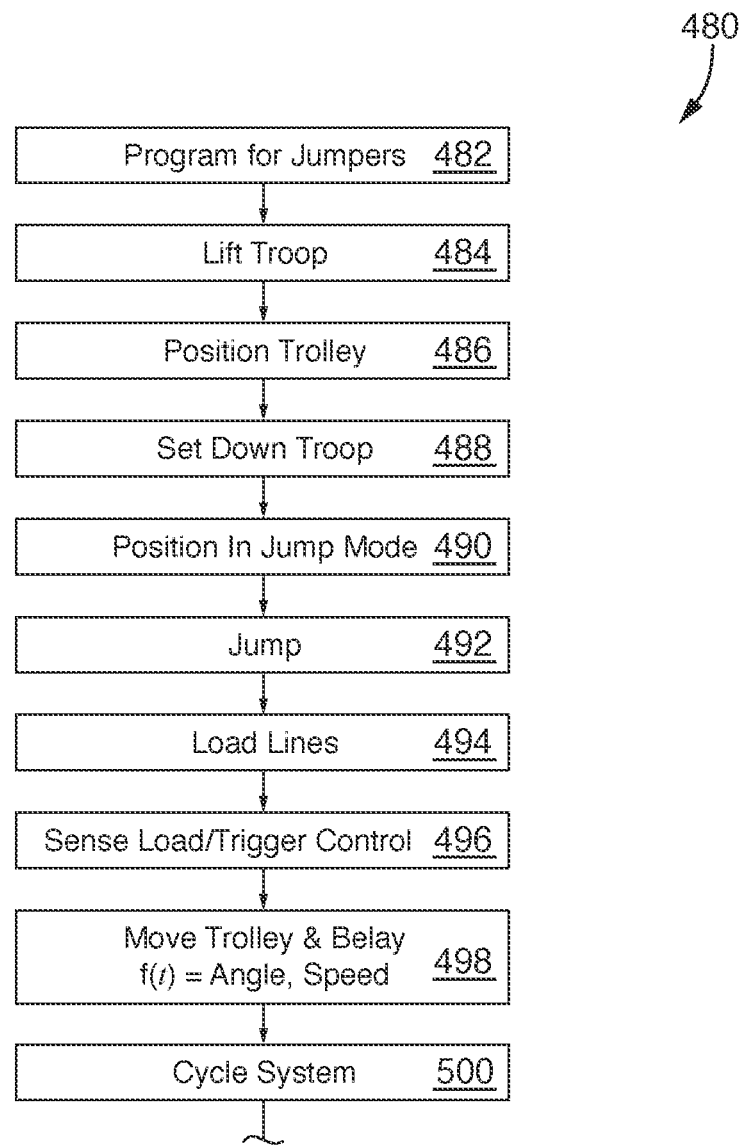
FIG. 15 is a schematic block diagram of a method or process for operating a system in accordance with the invention as a jump tower for programmed training.

Referring to FIG. 15, the programmatic control over the belay lines 294, 304 and trolley take-up lines 296 provides a great degree of control. For example, in previously discussed embodiments, the safety of a rider militated for certain controls, limits, trajectories, and the like. Likewise, comfort affected the programmatically controlled speed of movement of the trolley 110 in the falling mode. However, another method 480 or process 480 may be used to convert the operation of the system 10 into a jump tower 10.

For example, in the process 480 of FIG. 15, a platform 452 is illustrated (strictly as an option) in FIG. 10. Specifically, for example, it 452 is not appropriate for a climbing operation mode. It may be added later or foldable upward out of the way of a climber 60. Accordingly, as discussed hereinabove the belay take-up system 140*a* and the trolley take-up system 140*b* may be programmatically controlled. They may be programmed 482 for a jump mode rather than a climbing and falling mode.

For example, programming 482 may provide for lifting a troop 60. Herein, the term "troop" 60 means a human 60, such as a military service member 60. Various military services train members 60 as paratroops or paratroopers 60. Accordingly, a troop 60 may be considered to be any member 60 of any branch of a military or other service wherein jump training or parachute training is desired or required.

The trolley 110 may be positioned to assure a troop 60 will clear (miss; not collide with) the platform 452. This will permit a user 60 or rider 60 to rise sufficiently above the platform 452 to then be positioned 486 with the trolley 110 toward the tower 14 and above the platform 452. At this point, the belay lines 294 may be extended while the trolley 110 remains stationary as the troop 60 is set down 488 gently on the platform 452.

In certain embodiments, the platform 452 may be provided with framing on the sides, or other accoutrements effective to provide more realism to a jump experience 480. For example, it may be desired to provide a predetermined amount of slack in the belay lines 294 in order to provide true free fall upon exiting the platform 452. Also, for example, the trolley 110 will typically then be re-positioned 490 in a jump mode that places the trolley 110 away from the tower 14 and away from the platform 452*a* suitable distance in order to provide the jump experience 480 or process 480 with a true leap 492, unimpeded, from the platform 452. Again, either a predetermined amount of slack, or a predetermined load may be provided. Typically, true free fall should occur briefly upon a user 60 leaving the platform 452, before being engaged by tension in the lines 294, 304.

Thus, after positioning 490 the trolley 110 in a jump mode position, a user 60 may leap 492 or jump 492 off the platform 452 and away from the tower 14. In order to render the process 480 or experience 480 more realistic, a sensor 160*b* as discussed hereinabove may be placed in any suitable location discussed hereinabove in order to detect loading 494 of the lines 304 by the user 60.

Upon sensing 496 or triggering 496 the sensing of loading 494, the controllers 140*a*, 140*b* may then be engaged to actuate and move 498 the take-ups 290, 292 in order to provide a specific trajectory to the user 60. Trajectories have been discussed hereinabove in many modes. In the process 480, the trajectory differs primarily in the fact that a user 60 may be permitted more slack and length (e.g., extension) of the line 294, 304 sufficient to reach (and more) the floor 44 or ground 44 that acts as a supporting surface 44.

For example, in jump training, the skills to be learned include approaching a landing surface 44 at different angles, reflecting a velocity vector combining the speed of wind carrying a parachute and user 60 as well as a vertical descent rate or vertical velocity due to gravity. Thus, as discussed hereinabove, the programmatic control of the controllers 140*a*, 140*b* controls the belay lines 294, 304 respectively.

Referring to FIG. 15, moving 498 the trolley 110 and the belay lines 294, 304 in the thrill ride mode necessarily involves different safety considerations, and the programmatic control of swinging. However, in contrast, the process 480 or method 480 that operates as a jump or experience 480 necessarily will eventually require contact by a user 60 with the supporting surface 44 operating as the ground 44. Thus, rather than moving the belay take up 290 and the trolley take up 292 exclusively independently and at different times, a jump scenario will typically require moving 498 simultaneously, as a function of time, the trolley 110 and the belay lines 294, 304 to accomplish control over both the landing angle and the speed.

This may be done by controlling both the user's 60 horizontal speed with respect to the tower 14, or, in other words, parallel to the surface 44, as well as the vertical speed, toward the landing surface 44. Inasmuch as positive control over the trolley 110, its position, and its velocity in either direction is provided by a positive drive system 470, this may be done programmatically. The positive drive system 470 may actually move the trolley 110 outward away from the tower 14 along the rail 112 faster than a falling user 60 would drive the trolley 110.

Likewise, the positive drive system 470 may slow the movement of the trolley 110 sufficiently that a user 60 is substantially always suspended directly under the trolley 110. Thus, any rate of forward speed and any rate of drop or vertical speed may be engineered and programmed simply by programming speeds of take-ups 290, 292 in the controller 140*a* over the belay lines 294, 304 and the controller 140*b* controlling the positive drive system 470.

Ultimately, a rider 60 or user 60 will land at the ground surface 44 and will need to execute certain maneuvers. These may involve a forward roll, tumbling, or even being drawn forward. For example, landing in high winds will often result in a parachute pulling against the footing of a user 60 who has landed on the ground. By selecting the speed of descent, the forward speed, and so forth, sufficient length of the rail 112 may remain to draw a user 60 forward away from the tower 14 after the user 60 has landed on the surface 44.

One may see that programmatic control may be asserted due to the fact that two independent variables, the length of extension of the belay lines 294, 304 and the position of the trolley 110 may both be controlled. This also includes the mathematical variables of the speed and acceleration of the trolley 110 along the rail 112. It is clear that the hydraulic control of the rate of feed (or speed) of extension of the take-up lines 294, 304 is controlled as well as discussed hereinabove. This number of independent mathematical variables provide substantial dynamic control to define the angle and speed of descent. This may be described as the ultimate vector constituted by forward speed away from the tower 14 and speed of descent.

It is contemplated that slack will be provided after landing on the surface 44 by a user 60 in order to provide the mechanical freedom of motion of the user 60 in executing the landing maneuvers, such as tumbling, arising, resisting the windward pull of a parachute, and so forth.

Of course, cycling 500 the system 10 may include repeating a jump 480 of a user 60 immediately without removing a harness 28, belay lines 304 or the like. Thus, an individual user 60 may cycle through jump cycles 480 literally in seconds. Meanwhile, cycling 500 the system 10 and the process 480 may also involve reprogramming 482 for a new user 60. It is contemplated that programming 482 may involve multiple jump cycles 480 by a single user 60 or multiple jumps by different users 60 in order to provide an efficient process 480 in terms of throughput of users 60 or trainees 60 mounting the platform 452 and jumping 492 therefrom.

Control screens and control input buttons may be used by an operator to set up and operate the system 10. Numerous variables whether independent variables (inputs used for control) or dependent variables (outputs resulting from inputs and programmatic manipulations to assert control as to output) may be set and monitored, respectively, through a series of set up pages or presentations on a control console. For example, on a cycle in which the trolley 110 is to be traversing outward away from the tower 14 along the rail 112 various monitors and settings are included. For example, a trolley home proximity sensor is detected, a rope in the down position proximity sensor is detected, as well as the end proximity sensors out and back during a swing.

Meanwhile, the swing out time and the swing back time may be monitored as well as the total swing time for a first cycle out and back and a second cycle out and back. Of course, the total number of cycles that a system 10 has undergone will be monitored and acceleration will be calculated. Various selections of mode and loading may be provided as well as other status, set up, alarms, and control screens.

Also, for example, the position of the trolley 110, its main sheave, the line 304 extending therefrom, the pressure in a hydraulic accumulator (stabilized feed) tank, the trolley speed, a rider wait time, wind speed, and wind direction may all be monitored. Meanwhile, slip in a forward direction and a reverse direction may be detected and totaled in order to determine adjustments on drive systems 292. Meanwhile, tension in the lines 294, 305 may be measured including a maximum and minimum as well as different locations therealong. This may include the tension in a line 304 that should check out against the weight of a rider 60.

A similar set of parameters may be set, detected, and otherwise used in the process of a "bump" in which the simple swing trajectory is interrupted by the attenuation process discussed hereinabove. Numerous alarms may be cycled through in sequence, and may flash on a screen with some descriptor as well as some global characterization of the alarm. These alarms may be cycled through by an operator for a user 60 wishing to review or clear alarms that have "gone off."

Certain timers may be set. For example, these may include a delay in retrieving a line 405, a delay in sending a trolley 110 out away from the tower 14, as well as a delay of the trolley 110 in retrieving back toward the tower 14. Similarly, the lines 304 and the trolley 110 may also have a delay set corresponding to a landing event by a user 60 on the surface 44.

In certain embodiments, a wind set up may reflect meteorological conditions at a site. For example, a direction may be from the north, south, east, west or any intermediate compass point, such as northeast, southeast, southwest, northwest, and so forth. Typically the wind speed and anticipated gust speed may be monitored, and may be fed into the system 10. However, in certain embodiments, the system 10 may automatically accommodate such conditions up to some maximum amount of gusting or turbulence.

Various positions may be monitored, set, or both. For example, a setting for an encoder tracking activities of a particular sheave may be monitored to establish the positons between starting and ending or an intermediate controlled position of the trolley 110. Similarly, the lines 294, 304 associated with the belay process may also be monitored to control such things as initial position, final position, offsets, scaling, sensors, and the like.

In fact, some of the parameters that are typically monitored include wind, tension in lines 294, 296, pressures in hydraulic systems, distance of payout, particular position, and the like in lines 294, 296, 304 are significant and meaningful. Similarly, the position, speed, and acceleration of the trolley 110 may be controlled, monitored, and compared. Timers, of course, as discussed hereinabove are significant mechanisms for feeding back inputs required to control the processes through which the system 10 may operate. Alarms have been discussed briefly, and may be set to detect any sensor being "out of sorts," or a parameter detected by a sensor being outside of an expected range of values.

The hydraulic pump actually driving hydraulic fluids is not best connected directly to the belay system 290. Rather, pressure will be maintained in a tank (accumulator) that provides a uniform and repeatable pressure for activating the hydraulic cylinders. Thus, the pressure at a top and a bottom of such a tank may be monitored. Similarly, pressures into and out of the pump may be monitored and maintained within certain operational parameters. Of course, a set point is typically specified in advance to be maintained, and controls will activate to maintain that pressure in the accumulator.

In setting up the ropes or lines 294, 304 an upper limit, a ramp up or variation in the rate, a maximum speed and a lift speed may be specified. Similarly, a landing target location user lift locations may be specified spatially. Meanwhile, a height (near ground 44) at which a user 60 or other weight may be monitored, as well as maximum climbing height, the limits on loading or extension that a line 304 may be given, which will typically be at the surface 44, but may be greater in a jump procedure 480.

Meanwhile, a landing position in a slow mode or maximum speed downward, the timer position at which weighing will take place, landing speed in a fast mode or low speed mode as well as the "walk in" speed as the trolley 110 is returned to some registration position close to a frame 14 or wall 12. Meanwhile, jogging downward in response to control may be controlled as to its speed as well as lift speeds upward or descent speeds permitted downward may be controlled, monitored, or both.

Similarly, with the positive drive system 470 the trolley 110 set up may include the transit speed outward away from the tower 14 as well as outward in a slower (e.g., transport, positioning) mode, the first and second "bumps" and their timing and duration relative to the swing may be set and monitored. Meanwhile, speed to approach a landing position as well as jogging to a position for a specific purpose and the monitored actual speed may all be displayed for feedback and control. Acceleration, deceleration, and accelerations to the swing curve or decelerations thereto as well as positions at which stops, landing, or slowing will occur may all be set.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

Wherefore, what is claimed is:

1. A method comprising:
providing a first line having first and second ends, a first takeup secured proximate the second end, a carrier capable of translating horizontally, and a first sheave rotatably mounted to the carrier;

reeving the first line about the sheave to be capable of moving the first end between a first level proximate a supporting surface and a second level proximate the sheave;

positioning the carrier proximate a first position, above the supporting surface;

securing a user to the first line proximate the first end and proximate the first level;

taking up the first line proximate the second end as the user ascends toward the second level;

translating the carrier toward a second position as the user descends away from the first position;

swinging the user along a trajectory defined by the first line and the first sheave; and attenuating the swinging by moving the carrier toward at least one of the first and second positions during a portion of the swinging toward that position, wherein the attenuating is effected after at least one full cycle, wherein one full cycle constitutes swinging past a bottom dead center position at least twice.

2. The method of claim 1, comprising:

providing a wall capable of being climbed by the user and extending from proximate the supporting surface to proximate the first position; and belaying the user by the first take-up taking up the first line during climbing the wall by the user while the second take-up remains unmoved.

3. The method of claim 1, wherein the carrier comprises a trolley operating along a track extending away from a tower supporting the track;

the method comprises the user engaging in a pendulum fall from proximate the second level; and the first take-up maintains a fixed length of the first line paid out from an initiation of, to the end of, the pendulum fall.

4. The method of claim 1, comprising:

providing a wall extending from the supporting surface to proximate the first position;

providing a hydraulic hoist as the first take-up;

belaying the user during climbing by powering the hydraulic hoist from an accumulator operably connected to provide pressurized fluid thereto;

locking the hoist against movement;

paying out the first line over the sheave in consequence of the carrier retreating away from the first position toward the second position;

swinging the user following the pendulum fall;

attenuating the swinging by moving the carrier in the same direction the user is moving.

5. A method comprising:

providing a sheave rotatably connected to a carrier, the carrier positioned above a supporting surface and capable of moving between a first position and a second position spaced horizontally apart;

providing a first line, having first and second ends, and being reeved therebetween about the sheave while connected to a first take-up proximate the second end to be capable of moving the first end between a first level proximate the supporting surface and a second level proximate the sheave in response to selectively taking up and paying out the first line proximate the second end;

lifting a user, secured to the first end, toward the second level;

sending the user into a pendulum fall by moving the carrier from the first position toward the second position;

belaying the user while climbing a wall extending from proximate the first level to proximate the second level by the first take-up retrieving the first line in correspondence with the user ascending the wall; and controlling a trajectory of the user by operating a second take-up operably connected to control movement of the carrier, driven by a positive drive system programmatically controlled.

6. The method of claim 5, comprising:

swinging the user, following the pendulum fall, back past a bottom dead center position; and attenuating the swinging by moving the carrier and sheave, while, and in the same direction, the user is moving.

7. The method of claim 5, comprising:

providing a simulated parachute jump to a user by programmatically controlling a trajectory of the pendulum fall by permitting and controlling movement of the first take-up and the carrier simultaneously.

* * * * *